United States Patent [19]

Shah

[11] 4,148,840

[45] Apr. 10, 1979

[54] POLYMER/POLYOL COMPOSITIONS MADE FROM PREFORMED POLYMER/POLYOLS, PROCESSES FOR MAKING SAME AND PROCESSES FOR MAKING POLYURETHANE PRODUCTS THEREFROM

[75] Inventor: Naresh R. Shah, Nitro, W. Va.

[73] Assignee: Union Carbide Corporation, New York, N.Y.

[21] Appl. No.: 891,308

[22] Filed: Mar. 29, 1978

[51] Int. Cl.$^2$ .................. C08L 75/04; C08L 33/20
[52] U.S. Cl. .................. 260/859 R; 260/33.4 R; 260/33.4 UR; 260/844; 260/845; 260/848; 260/874; 260/879; 260/881; 260/885; 260/886; 521/137
[58] Field of Search ............. 521/137; 260/33.4 R, 260/33.4 UR, 844, 845, 848, 859 R, 874, 879, 881, 885, 886

[56] References Cited

U.S. PATENT DOCUMENTS

| | | | |
|---|---|---|---|
| 3,085,983 | 4/1963 | Hardy | 260/2.5 |
| 3,304,273 | 2/1967 | Stamberger | 260/2.5 |
| 3,383,351 | 5/1968 | Stamberger | 260/33.2 |
| 3,655,553 | 4/1972 | Dewald | 252/1 |
| 3,823,201 | 7/1974 | Pizzini et al. | 260/861 |
| 3,850,861 | 11/1974 | Fabris et al. | 260/2.5 BE |
| 3,953,393 | 4/1976 | Ramlow et al. | 260/31.8 R |
| 3,966,521 | 6/1976 | Patton et al. | 156/78 |
| 4,014,846 | 3/1977 | Ramlow et al. | 521/137 X |

FOREIGN PATENT DOCUMENTS

| | | |
|---|---|---|
| 735010 | 5/1966 | Canada. |
| 785835 | 5/1968 | Canada. |
| 52-80919 | 1/1977 | Japan. |
| 1022434 | 3/1966 | United Kingdom. |

*Primary Examiner*—Carman J. Seccuro
*Attorney, Agent, or Firm*—Richard J. Gallagher

[57] ABSTRACT

Novel improved polymer/polyol composition made by polymerizing one or more ethylenically unsaturated monomers in situ in a blend of a polyol having a number average molecular weight of at least about 76 and a preformed polymer/polyol prepared by the in situ polymerization of one or more polymerizable ethylenically unsaturated monomers in a polyol, said preformed polymer/polyl having a viscosity of not more than 40,000 cps at 25° C., to form a highly stable dispersion of small polymer particles in said polyols, wherein said preformed polymer/polyol and said improved polymer/polyol composition are more stable than the polymer/polyol having the same chemical composition as said improved polymer/polyol composition but made in the absence of said preformed polymer/polyol. The novel compositions are highly useful in the production of polyurethane products.

39 Claims, No Drawings

POLYMER/POLYOL COMPOSITIONS MADE FROM PREFORMED POLYMER/POLYOLS, PROCESSES FOR MAKING SAME AND PROCESSES FOR MAKING POLYURETHANE PRODUCTS THEREFROM

BACKGROUND OF THE INVENTION

1. Field of the Invention

The invention relates to novel polymer/polyol compositions that are reactive with polyisocyanates to produce polyurethane products. The invention also relates to novel methods for making such compositions and to methods for making polyurethane products therefrom.

2. Description of the Prior Art

Polymer/polyol dispersions have been and currently are being used in the production of polyurethane products. Such dispersions result in polyurethane products having a wide variety of desirable properties.

There are a number of prior art disclosures relating to the production of polymer/polyol dispersions including the Stamberger patents, U.S. Pat. Nos. 3,304,273; 3,383,351; Re. 29,118 (reissue of 3,304,273) and Re. 28,715 (reissue of 3,383,351); the Stamberger British Pat. No. 1,022,434; the Scharf et al. and Kuryla Canadian Pat. Nos. 735,010 and 785,835; the Pizzini et al. U.S. Pat. No. 3,823,201; Re. 29,014 (reissue of 3,823,201); the Ramlow et al. U.S. patent application, Ser. No. 431,080, filed Jan. 7, 1974; the Ramlow et al. patent U.S. Pat. No. 3,953,393; the DeWald U.S. Pat. No. 3,655,553; and Japanese Patent JA 52005887 (Application No. 8099/1975, Laid Open No. 5887/1977).

Each of these prior art disclosures beginning with the Stamberger patents describes the production of polymer/polyol dispersions by polymerizing one or more ethylenically unsaturated monomers in situ in a polyol to form dispersions of small polymer particles dispersed in the polyol. The dispersions are then mixed with polyisocyanate and other polyurethane-forming reagents and reacted to form the polyurethane product and serve as a convenient, efficient and economical means for improving resultant polyurethane properties. This procedure and the resulting polymer/polyol dispersions have been widely accepted by the polyurethane industry and continue to be extensively used throughout the industry.

While the prior art polymer/polyol dispersions have found extensive use throughout the polyurethane industry, the development of more sophisticated, higher speed and larger volume equipment, machines and systems for handling, mixing and reacting the polyurethane-forming ingredients have created the need for improvements in polymer/polyol dispersions. The need for more stable dispersions has developed so that they can be stored until used without undergoing any significant settling. At one time there was not much concern for the seediness, viscosity or filterability of polymer/polyols in actual commercial practice. However, the state of the art of polyurethane production now has advanced to the point where these considerations are very important. There is now much concern with filterability, seediness, and viscosity because of the more sophisticated machine systems now in use for large volume production. Also, the prior art dispersions could not be made in highly stable condition with the relatively low molecular weight polyols such as dipropylene glycol, thus rendering the lower molecular weight materials less desirable than the higher molecular weight materials as a polyol component of polymer/polyol dispersions. The lower molecular weight polyols, however, are of value in those instances where low viscosity is essential and for foams, coatings, adhesives and some types of sealants.

The present invention provides highly stable and highly filterable polymer/polyol compositions which are low in, or substantially free of, seediness. It provides better dispersion stability than can be obtained by earlier procedures and/or eliminates or minimizes the expenses and hazards or difficulties accompanying some of the earlier techniques. The present invention also provides means for providing highly stable or reasonably stable polymer/polyol compositions having high polymer contents by using relatively small amounts of stable preformed polymer/polyols having low to moderate polymer contents which are easier to make. It also permits a wider selection of polyols, polymer compositions and polymer contents to be used in the manufacture of stable polymer/polyol compositions. It also permits the use of base polyols of lower viscosities and/or preformed polymer/polyols of lower viscosities. It also permits comparatively higher polymer contents in the dispersion at lower viscosities without impairing stability. These and other advantages are obtained by employing a blend of base polyol and a relatively small amount of a more stable preformed polymer/polyol prior to mixing with the monomer or monomers for the in situ polymerization.

The use of polyol blends to produce polymer/polyols has been disclosed by the above-identified Stamberger, Scharf et al., Kuryla, Pizzini, Ramlow et al. and DeWald patents and the Ramlow et al patent application. The use of low molecular weight polyols in polymer/polyol dispersions is mentioned in the Stamberger British patent. However, nowhere in any of these references is there any disclosure or suggestion of the discovery of the advantages of the present invention by the use of blends containing a small amount of a more stable preformed polymer/polyol and a major amount of the base polyol for the production of stable polymer/polyol compositions as described and claimed herein.

The DeWald patent discloses that the polyol is preferably a triol but can contain as much as 40 percent of a diol or tetrol having the same molecular weight range. The molecular weights of the polyols do not exceed 5500, are preferably no more than 5000 and are advantageously in the range of 1500–5000 and preferably 3000–5000.

The Pizzini patent discloses the use of a polyol blend consisting of two polyols having the same molecular weights. The Ramlow et al. patent application discloses the preparation of polymer/polyol dispersions from polyol blends and vinyl or vinylidene halogenide monomers and alleges improvements in stability.

The Ramlow et al. patent discloses the preparation of polymer/polyol dispersions by polymerizing vinyl monomers in the presence of alkyl mercaptans as chain transferring agents in specially formulated, unsaturation-containing polyols containing specified, and allegedly critical, amounts of unsaturation.

The Japanese patent discloses the manufacture of polymer/polyols using modified polyols, i.e., polyesters, formed by reacting a mixture of saturated and unsaturated dibasic organic acid with a polyol. A vinyl type monomer, e.g., styrene, is then polymerized in situ in the resulting modified polyol or polyester. The resulting polymer/polyol is used in the manufacture of polyurethanes.

None of the prior art references mentioned above and no prior art is known which discloses, teaches or suggests stable polymer/polyols having the advantageous properties of the compositions of this invention prepared from ethylenically unsaturated monomers by the use of blends of a large amount of a polyol having a number average molecular weight of at least about 76 and a small amount of a preformed polymer/polyol as described herein.

SUMMARY OF THE INVENTION

The present invention provides polymer/polyol compositions that are highly stable and highly filterable. These compositions, in addition to being highly stable, can be highly fluid and substantially free of scrap and seeds. The polymer particles of the compositions of this invention are small in size, in a preferred embodiment less than 30 microns in diameter. Polymer/polyol compositions can be made, according to this invention, with exceptionally low viscosities. They can also be made with relatively high polymer contents. Polymer/polyol compositions of this invention are readily convertible to polyurethane products of exceptional properties, including in certain cases high load bearing capacity and high resistance to discoloration.

The above-mentioned deficiencies of the prior art can be overcome by this invention by the blending of a small amount of a preformed polymer/polyol with the base or first polyol usually of a lower molecular weight which is desired to be used in the production of the final polymer/polyol compositions prior to mixing in with the monomer or monomers for the in situ polymerization to produce said compositions. The preformed polymer/polyol is formed by the in situ polymerization of a polymerizable ethylenically unsaturated monomer or a mixture of such monomers in the second polyol, preferably a relatively high molecular weight polyol. The preformed polymer/polyol itself is a stable dispersion of the polymer formed from the monomer or monomers in the second polyol and can contain low to moderate to high amounts of polymer.

In its broad aspect, this invention achieves the above-mentioned advantages by providing stable liquid polymer/polyol compositions which are convertible by reaction with polyisocyanates to polyurethane products wherein the polymer/polyol composition is normally liquid at the temperature at which the composition is converted to the polyurethane product and the polymer/polyol composition is formed in situ from one or more polymerizable ethylenically unsaturated monomers. The polymer/polyol compositions of this invention are preferably liquid at 25° C. The invention provides stable dispersions of small particles of the polymers in the polyols by the in situ polymerization of the monomer, or mixture of monomers, in a blend comprising a major amount, preferably about 55 to about 95 wt-% of a polyol having a number average molecular weight of at least about 76, preferably 134, and from about 45 to about 5 wt-% of a preformed polymer/polyol made by the in situ polymerization of one or more polymerizable unsaturated monomers in a polyol having a number average molecular weight of not less than about 2500. Another advantage of this invention is that a wider range of free radical catalysts can be used in the polymerization forming the final polymer/polyol without critically narrow limitations and without substantially impairing stability or filterability. For example, the azo catalysts as well as peroxide catalysts can be used as desired or required and catalysts can be selected that are safer and easier to use.

The invention also relates to the process for making the above-mentioned compositions and the process for making polyurethane products using same. Polymer/polyol compositions of this invention are convertible by reaction with polyisocyanates to high modulus polyurethane elastomers and foams.

DESCRIPTION OF SPECIFIC EMBODIMENTS

The novel polymer/polyol compositions of this invention are liquid, stable dispersions of polymers in a blend comprising a major amount, preferably about 55 to about 95 wt-%, most preferably about 70 to 90 wt-%, of one or more polyols having a number average molecular weight of at least about 76, hereinafter also called the first or base polyol or polyols, and a minor amount, preferably about 5 to 45 wt-%, most preferably about 10 to about 30 wt-%, of a preformed polymer/polyol formed by the in situ polymerization of a polymerizable ethylenically unsaturated monomer or mixture thereof in a polyol which can be the same or different from the first polyol and is hereinafter also called the second polyol, said novel polymerizable composition and the preformed polymer/polyol from which it is made being more stable, i.e., having a greater dispersion stability, than the polymer/polyol having the same chemical composition as that of said novel polymer/polyol composition and made in the same manner as said novel polymer/polyol composition but in the absence of said preformed polymer/polyol. The weight percents are based on the total weight of said first polyol and said preformed polymer/polyol in the composition. The preformed polymer/polyol has a viscosity of less than 40,000 cps, preferably not greater than 35,000 cps, more preferably not greater than 25,000 cps and most preferably not greater than 10,000 cps, at 25° C. There is substantially no lower limit on the molecular weight of the first polyol nor upper limit on the molecular weight of the second polyol so long as the polyols are liquid and the blend and the final polymer/polyol possess the viscosities desired. The molecular weight of the first polyol can be in the range of about 76 to about 5000 or more, preferably, about 134 to about 3000. The molecular weight of the second polyol can be at least about 2500, preferably about 3000 to about 20,000 and most preferably from about 3000 to about 15,000. The number average molecular weights of the polyols are used herein and are the theoretical (or apparent) values calculated from theoretical functionality and hydroxyl number. The true number average molecular weights may be somewhat less, depending on how much the true functionality is below the starting or theoretical functionality. Obviously, in order to secure stable dispersions, all components should be compatible with each other.

The proportion of total polymer in the polymer/polyol compositions of this invention can range from about 4 to about 45 wt-%, preferably from about 15 to about 40 wt-%, the percents being based on the total weight of the total polymer/polyol composition including the polymer in the preformed polymer/polyol as well as that formed in the blend of same with the first polyol.

Substantially any of the polyols previously used in the art to make polymer/polyols can be used for the first and second polyols in this invention provided they meet the mutual compatibility requirement set forth above. Illustrative of the polyols useful as the first and second polyols in producing polymer/polyol compositions in accordance with this invention and the preformed polymer/polyols used to make said compositions, are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl numbers which vary over a wide range. In general, the hydroxyl numbers of the polyols employed in the invention can range from about 20, and lower, to about 1200, and higher. The hydroxyl number is defined as the number of milligrams of potassium hydroxide required for the complete hydrolysis of the fully phthalated derivative prepared from 1 gram of polyols. The hydroxyl number can also be defined by the equation:

$$OH = \frac{56.1 \times 1000 \times f}{m.w.}$$

where
OH = hydroxyl number of the polyol
f = functionality, that is, average number of hydroxyl groups per molecule of polyol
m.w. = molecular weight of the polyol.

The exact polyol employed depends upon the end-use of the polyurethane product to be produced. The molecular weight or the hydroxyl number is selected properly to result in flexible or semiflexible foams or elastomers when the polymer/polyol produced from the polyol is converted to a polyurethane. The polyols preferably possess a hydroxyl number of from about 50 to about 150 for semi-flexible foams, and from about 25 to about 70 for flexible foams. Such limits are not intended to be restrictive, but are merely illustrative of the large number of possible combinations of the above polyol coreactants.

The most preferred polyols employed in this invention include ethylene glycol, diethyleneglycol, the poly(oxypropylene) glycols, triols and higher functionality polyols. These polyols also include poly(oxypropyleneoxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. As taught by Stamberger, unsaturation in itself does not affect in any adverse way the formation of the polymer/polyols in accordance with the present invention except in the case where the extent or type of unsaturation is so high or effective as to result in a crosslinked polymer.

The polymerizable ethylenically unsaturated monomers which can be used in this invention to form the preformed polymer/polyol and the final polymer/polyol compositions of this invention include the polymerizable ethylenically unsaturated hydrocarbon monomers and polymerizable ethylenically unsaturated organic monomers, the molecules of which are composed of carbon, hydrogen and at least one of halogen, O, S, or N. The monomers useful in the process of this invention are the polymerizable monomers characterized by the presence therein of at least one polymerizable ethylenic unsaturated group of the type C=C. The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7-octadiene, styrene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, ethyl alpha-ethoxyacrylate, methyl alphaacetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, acrylonitrile, and the like; vinylidene chloride; the vinyl esters, vinyl ethers, vinyl ketones, etc., such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Any of the known chain transfer agents can be present if desired.

The preferred monomer used to make the polymers of the preformed polymer/polyols and the final polymer/polyol compositions of this invention is acrylonitrile alone as a homopolymer or in combination with styrene as a copolymer. The relative weight proportions of acrylonitrile to styrene illustratively range from about 0:100 to about 100:0, preferably from about 20:80 to about 100:0, more preferably about 25:75 to about 100:0, and when low molecular weight polyols, e.g., below about 200, are used as the first or base polyol, then the weight ratio should be from about 40:60 to about 85:15. Terpolymers of acrylonitrile, methyl methacrylate, and styrene have also been employed.

Catalysts useful in producing the preformed polymer/polyols and the final polymer/polyol compositions of this invention are the free radical type of vinyl polymerization catalysts such as the peroxides, persulfates, perborates, percarbonates and the azo compounds or any other suitable catalyst specified in the above-mentioned patents and application. Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-diper-2-ethyl hexoate, t-butylperneodecanoate, t-butyl perbenzoate, t-butylpercrotonate, t-butyl periosbutyrate, di-t-butyl perphthalate and the like. Azo bis-(isobutyronitrile) is the preferred catalyst since it does not impart any objectionable product odor or require special handling in the plant because of possible hazards. The peroxy catalysts are preferred for the manufacture of the preformed polymer/polyols.

The catalyst concentration is not critical and can be varied within wide limits. As a representative range in forming the preformed polymer/polyols and the final polymer/polyol compositions, the concentration can vary from about 0.1 to about 5.0 weight percent, based upon the total feed to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The polymerization to form the preformed polymer/polyols and/or the final polymer/polyol compositions can also be carried out with an inert organic solvent present that does not dissolve the polymer, although solvents are not essential for obtaining the advantages of this invention. Illustrative of suitable solvents are toluene, benzene, and the like, including those known in the art as being suitable solvents for the polymerization of vinyl monomers. The only requirement in the selection of the solvent and the polyol is that they do not interfere with the monomer's polymerization reaction. When an inert organic solvent is used, it is generally removed from the reaction mixture by conventional means before the polymer/polyol compositions are used to produce polyurethane foams.

The temperature range used in producing preformed polymer/polyol and the final polymer/polyol composition is not narrowly critical and may vary from about 80° C. or less to about 150° C. or perhaps greater, the preferred range being from 105° C. to 135° C. The catalyst and temperature should be selected so that the catalyst has a reasonable rate of decomposition with respect to the hold-up time in the reactor for a continuous flow reactor or the feed time for a semi-batch reactor.

The preferred process used in producing the preformed polymer/polyols and the final polymer/polyol compositions of this invention involves polymerizing the monomers in the polyol or polyol-preformed polymer/polyol blend while maintaining a low monomer to polyol, or polyol-preformed polymer/polyol blend ratio throughout the reaction mixture during the polymerization. This provides in the preferred case preformed polymer/polyols and final polymer/polyol compositions in which essentially all of the polymer particles have diameters of less than 30 microns and generally less than one micron. Such low ratios are achieved by employing process conditions that provide rapid conversion of monomer to polymer. In practice, a low monomer to polyol, or polyol-preformed polymer/polyol blend ratio is maintained, in the case of semi-batch and continuous operation, by control of the temperature and mixing conditions and, in the case of semi-batch operation, also by slowly adding the monomers to the polyol or polyol-preformed polymer/polyol blend. The process can be carried out in various manners such as by a semi-batch reactor, a continuous back-mixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyol, or polyol-preformed polymer/polyol blend, ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyol or blend in the reactor at the start versus polyol or blend fed with the monomer) to effect changes in the product viscosity. Generally, longer feed times result in higher product viscosities and may allow use of slightly broader acrylonitrile to styrene ranges for a given polyol or blend and polymer content.

The preferred temperature used in producing the preformed polymer/polyols and the final polymer/polyol compositions in accordance with this invention is any temperature at which the half life of the catalyst at that temperature is no longer than about 25 percent of the residence time of the reactants and catalyst in the reactor. As an illustration, the half life of the catalyst at a given reaction temperature may be no longer than six minutes (preferably no longer than from 1.5 to 2 minutes) when the residence time is 24 minutes or greater. The half lives of the catalysts become shorter as the temperature is raised. By way of illustration, azobisisobutyronitrile has a half life of 6 minutes at 100° C. and, thus, the residence time should be at least 24 minutes. The maximum temperature used is not narrowly critical but should be lower than the temperature at which significant decomposition of the reactants or discoloration of the product occurs.

In the process used to produce the preformed polymer/polyols and the final polymer/polyol compositions of this invention, the monomers are polymerized in the polyol or polyol-preformed polymer/polyol blend. Usually, the monomers are soluble in the polyol and the blend. It has been found that first dissolving the monomers in a minor portion of the polyol or blend and adding the solution so formed to the remainder of the polyol or blend at reaction temperature facilitates mixing the monomers and the polyol or blend and can reduce or eliminate reactor fouling. When the monomers are not soluble in the polyols or blends, known techniques (e.g., dissolution of the insoluble monomers in another solvent) can be used to disperse the monomers in the polyol or blend prior to polymerization. The conversion of the monomers to polymers achieved by this process is remarkably high (e.g., conversions of at least 72% to 95% of the monomers are generally achieved). The preformed polymer/polyols employed in this invention are not intermediate reaction products such as might be found at an intermediate stage in a reactor during a batch or semi-batch polymerization of a monomer or monomers in a polyol but are end products of the in situ polymerization of a monomer or monomers in a polyol at high conversions. The preformed polymer/polyols thus are preferably characterized by high dispersion stability.

In the case of copolymerizing acrylonitrile and styrene the ratio of acrylonitrile to styrene in the polymer is always slightly lower than the ratio of acrylonitrile to styrene monomer in the feed because the styrene tends to react slightly faster than the acrylonitrile. For example, if acrylonitrile and styrene monomers were fed at a weight ratio of 80:20, the resulting polymer would have an acrylonitrile to styrene weight ratio of about 79:21 or 78:22.

Preferably, the preformed polymer/polyol selected for blending with the first or base polyol has a greater dispersion stability than that desired for the final polymer/polyol composition. Using centrifugible solids, as determined by the test method fully described hereinafter in connection with the examples, as a measure of dispersion stability, it is preferred to employ a preformed polymer/polyol having a centrifugible solids of not more than 20 wt-% and, more preferably, of not more than 10 wt-%. Preformed polymer/polyols of the desired high degree of dispersion stability can be provided by any suitable technique including the selection of the base polyol, the free radical catalyst, the type of process (batch, semi-batch or continuous), and/or the process conditions, including, for example, the reaction conditions, concentration of catalyst, monomer to polyol ratio throughout the reaction mixture during polymerization, feed time and the proportion of polyol in the reactor relative to the proportion of polyol fed with the monomer. In the selection of the polyol, various modified polyols can be used in preparing the preformed polymer/polyol. For example, polyols modified with saturated dibasic organic acids producing diester groups intermediate in the polyol chain and/or at the ends thereof as described in Japanese Patent JA52005887. Also, higher molecular weight polyols are preferred in the manufacture of the preformed polymer/polyols for providing superior dispersion stability. For example, a blend of a major amount of a relatively low number average molecular weight polyol and a minor amount of a relatively high number average molecular weight polyol as described in my copending application Ser. No. 797,666 filed May 17, 1977, can be used in the manufacture of preformed polymer/polyols of high dispersion stability. Also, peroxy ester catalysts can be employed in manufacturing suitable high dispersion stability preformed polymer/polyols as described in copending application Ser. No. 594,649 filed July 10, 1975.

Furthermore, the use of dispersion stabilizers tailored to the monomer system employed in making the preformed polymer/polyol can be utilized to provide the desired dispersion stability to the preformed polymer/polyol. This procedure for improving dispersion stability of polymer/polyols is disclosed in copending application Ser. No. 572,818 filed Dec. 20, 1976, and employs a stabilizer, compatible with the polyol portion of the polymer/polyol, comprising a copolymer having an anchor portion of an ethylenically unsaturated monomer or mixture of such monomers and a solvatable portion of a propylene oxide polymer. The stabilizer can be utilized in the preparation of the preformed polymer/polyols to provide increased stability.

The process of this invention produces final polymer/polyol compositions which are highly stable and further characterized by relatively high polymer contents, small polymer particle size, freedom from scrap and seeds and convertibility to highly useful polyurethane elastomers and foams. More particularly, with a given polyol, the present invention allows the ratio of styrene to acrylonitrile, or the polymer content, to be increased, yet still providing products of improved stability. Also, more stable polymer/polyols may be made with lower molecular weight polyols than can be accomplished by prior processes. The final polymer/polyol compositions of this invention are stable dispersions such that essentially all of the polymer particles remain suspended on standing over periods of several months without showing any significant settling. The present invention permits the minimization or elimination of expenses, hazards and/or inconveniences (such as the production of odiferous or malodorous by-products) of earlier techniques for improving dispersion stability by confining such techniques, if used at all, to the manufacture of the preformed polymer/polyols which are used in small amounts in producing the final polymer/polyol compositions.

The polymer/polyol compositions of the present invention have improved dispersion stabilities as measured by centrifugible solids (CS) as determined by test methods hereinafter described. The novel polymer/polyol compositions have CS values that are at least 10 percent less, preferably at least 30 percent less, and most preferably 50 percent less, than the CS of a comparison polymer/polyol having the same chemical composition as that of the novel polymer/polyol composition and made in the same manner as said novel polymer/polyol composition but in the absence of the preformed polymer/polyol used to make the novel polymer/polyol composition. The "percent less than" figure is calculated by subtracting the CS of the novel polymer/polyol composition from the CS of the comparison polymer/polyol, dividing the resulting difference of the subtraction by the CS of the comparison polymer/polyol and multiplying by 100.

The present invention also permits the production of polymer/polyol compositions containing higher proportions of polymerized styrene, e.g., at A/S ratios of 25:75 to 0:100, which is advantageous from a cost standpoint since styrene is less expensive than acrylonitrile. Also, the higher proportions of polymerized styrene facilitate the achievement of improved flame retarding characteristics in polyurethane foams made with the novel polymer/polyol compositions containing the higher proportions of polymerized styrene.

The final polymer/polyol compositions of the present invention comprise dispersions in which the polymer particles (the same being either individual particles or agglomerates of individual particles) are relatively small in size and, in the preferred embodiment are all essentially less than 30 microns or even as small as 1 micron or less. Thus, in the preferred embodiment, essentially all of the product (viz. about 99 percent or more) will pass through the filter employed in the filtration test that will be described in conjunction with the Examples. This insures that the polymer/polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filter. Some applications may also find useful products in which only about 20 percent passes through. Accordingly, the polymer/polyols of the present invention contemplate products in which at least 20 percent pass through the filter, preferably at least 50 percent, and most preferably, essentially all.

In one aspect this invention is concerned with polymer/polyol compositions of higher than normal polymer contents in glycols or other very low molecular weight polyols, which still have commercially acceptable properties of low scrap and low filterable solids and no settling tendency. Polymer/polyols are normally stable dispersions of insoluble polymers (e.g., acrylonitrile polymers or acrylonitrile/styrene copolymers or any other monomer system) in a base polyol. It is also known that the base polyol molecular weight appears to have a substantial effect on the dispersion stability of the polymer/polyol. Generally, the higher the molecular weight of the base polyol, the better is the dispersion stability. Therefore, the production of stable polymer polyols in low molecular weight polyols heretofore has been difficult. In accordance with the present invention, blending a small amount (e.g., 5–45 percent) of a stable preformed polymer/polyol in a low molecular weight polyol results in improved dispersion stability in the final composition.

The effectiveness of a preformed polymer/polyol to improve dispersion stability of the final polymer/polyol composition depends upon (1) the dispersion stability of the preformed polymer/polyol and (2) its concentration in the blend of it and the first polyol. The higher the dispersion stability of the preformed polymer/polyol, the more the improvement in dispersion stability of the final polymer/polyol composition that is realized for the same amount of addition. Similarly, the higher the amount of the preformed polymer/polyol used, the more the improvement in dispersion stability that is achieved. Significant improvement in dispersion stability is achieved by adding as little as 5 to 45 percent by weight of a preformed polymer/polyol. However, when selecting the amount and type of the preformed polymer/polyol, other factors such as effects on foaming characteristics and urethane properties should also be taken into consideration.

The polymer concentration of the final polymer/polyol compositions of this invention can be adjusted by the addition of additional polyol to provide the polymer concentration suitable for the desired end use. In this manner, the polymer/polyol compositions can be produced at polymer concentrations of, for example, 20% and reduced to polymer concentrations as low as 4% by the addition of more polyol or, alternatively, the composition can be made directly with a polymer concentration of 4% by the method of this invention.

The present invention also provides novel polyurethane products made with the novel polymer/polyol compositions and novel methods for producing such products. The novel polyurethane products are prepared by reacting (a) a polymer/polyol composition of this invention, (b) an organic polyisocyanate, and (c) a catalyst for the reaction of (a) and (b) to produce the polyurethane product, and, when a foam is being prepared, a blowing agent and usually a foam stabilizer. The reaction and foaming operations can be performed in any suitable manner, preferably by the one-shot technique, although the prepolymer technique can be used if desired.

The organic polyisocyanates that are useful in producing polyurethane products in accordance with this invention are organic compounds that contain at least two isocyanate groups. Such compounds are well known in the art. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane bis(isocyanatohexyl) sulfide, 1,4-diisocyanatobenzene, 2,4-diisocyanatotoluene, 2,6-diisocyanatotoluene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, and polymethylene poly(phenyleneisocyanates) having the formula:

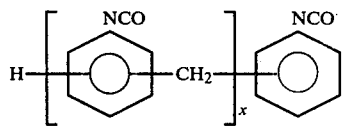

wherein x has an average value from 1.1 to 5 inclusive (preferably from 2.0 to 3.0), and mixtures thereof.

The catalysts that are useful in producing polyurethanes in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bisacetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures, (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

When the product being formed is a polyurethane foam, this may be accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

It is also within the scope of the invention to employ small amounts, e.g., about 0.001 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. patent application Ser. No. 888,067, filed Dec. 24, 1969, and British patent specification No. 1,220,471. The latter class of copolymers differs from the above-mentioned polysiloxane-polyoxyalkylene block copolymers in that the polysiloxane moiety is bonded to polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

The polyurethanes produced in accordance with this invention may be advantageously employed in various applications. For example, the present invention allows the production of polyurethane foams. Such foams may be desirably employed in the slab foam market. Still further, the polymer/polyols of this invention may be used to form polyurethane elastomers in which relatively low molecular weight polyols must be used to provide the requisite stiffness. Also, polymer/polyols pursuant to this invention may be employed to form polyurethane products for applications where high load-bearing characteristics are required. Polyurethanes produced according to this invention are useful in the applications in which conventional polyurethanes are employed such as in the manufacture of arm rests, crash pads, mattresses, automobile bumpers and carpet underlays.

The following examples are presented. The following designations used in the examples and elsewhere herein have the following meanings:

"A" denotes acrylonitrile.
"S" denotes styrene.
"MMA" denotes methyl methacrylate.
"A/S" denotes the weight ratio of acrylonitrile to styrene.
"A/MMA/S" denotes the weight ratio of acrylonitrile to methyl methacrylate to styrene.
"Calc" denotes calculated.
"cps" denotes centipoises.
"Viscosity" denotes viscosity in cps as determined at 25° C. on a Brookfield viscometer.
"gm" denotes grams.
"wt" denotes weight.
"hr" denotes hour.
"pbw" denotes parts by weight.
"Parts" denotes parts by weight.
"Poly A" denotes polymerized acrylonitrile.
"Poly S" denotes polymerized styrene.
"ppm" denotes parts by weight per million parts by weight.
"psig" denotes pounds per square inch gauge pressure.
Temperatures are given in ° C. unless otherwise stated.
"pli" denotes pounds per linear inch.
"Residuals" denotes unreacted monomers.
"rpm" denotes revolutions per minute.
"TDI" is a mixture of 80% 2,4-tolylene diisocyanate and 20% 2,6-tolylene diisocyanate.
"TMSN" is tetramethylsuccinonitrile (a decomposition product of VAZO-64).
"wt-%" denotes percent by weight.
"Cat." denotes catalyst.
"VAZO-64" or "VAZO" denotes 2,2'-azo-bis-isobutyronitrile.
"TBPO" denotes 50 wt-% t-butyl per-2-ethylhexoate in dioctylphthalate.
"Ratios" are based on weight.
"%" denotes percentage by weight unless otherwise statd.
Numbered Examples illustrate this invention.
Lettered Examples are comparative Examples which do not illustrate the invention or are Examples illustrating the preparation of preformed polymer/polyols used as precursors in numbered Examples.
"LMW" denotes lower molecular weight.
"HMW" denotes higher molecular weight.
"PPP" denotes preformed polymer/polyol.
Polyol to PPP ratios are on a weight basis given the % of the low molecular weight polyol first and the % of the PPP second.
Hydroxyl number denotes calculated hydroxyl numbers, mg KOH/gm, based on calculated total polymer content, if present, and hydroxyl number of polyol(s).

Light transmission data was obtained by using light of 500 millimicron wave lengths and the polymer/-polyol was in a 0.01% dilution in a clear solvent.

Polyol 1—Polypropylene oxide-polyethylene oxide triol made from propylene and ethylene oxides and glycerine and having a theoretical number average molecular weight of about 4700 and a hydroxyl number of about 35.9. The alkylene oxide units are present primarily in blocks and the end units are substantially all ethylene oxide units, i.e., the ethylene oxide is used to "cap" the triol. Based on its total weight, this triol contains about 14 wt-% $C_2H_4O$.

Polyol 2—Polypropylene oxide-polyethylene oxide triol made from propylene and ethylene oxides and glycerine and having a theoretical number average molecular weights of about 6000 and a hydroxyl number of about 26.1. The alkylene oxide units are present primarily in blocks and the end units are substantially all ethylene oxide units, i.e., the ethylene oxide is used to "cap" the triol. Based on its total weight, this triol contains about 14 wt-% $C_2H_4O$.

Polyol 3—Polypropylene oxide-polyethylene oxide polyol made from propylene oxide and ethylene oxide and an 80/20 blend by weight of sorbitol and glycerine, having a theoretical number average molecular weight of about 10,800 and a hydroxyl number of about 28. The alkylene oxide units are present primarily in blocks, and the end units are substantially all ethylene oxide units, i.e., the ethylene oxide is used to "cap" the polyol. The polyol contains about 8 wt-% ethylene oxide units based on the total polyol weight.

Polyol 4—Polypropylene oxide triol made from propylene oxide and glycerine and having a theoretical number average molecular weight of about 3000 and a hydroxyl number of about 55.4.

Polyols 5 and 6—Polypropylene oxide diols made from propylene oxide and dipropylene glycol and having a theoretical number average molecular weights and hydroxyl numbers correspondingly listed below:

| Polyol | M.W. | OH No. |
|---|---|---|
| 5 | 2000 | 55.95 |
| 6 | 1000 | 112.1 |

Polyol 7—Polypropylene oxide triol made from propylene oxide and glycerine and having a theoretical number average molecular weight of about 1500 and a hydroxyl number of about 108.7.

Polyol 8—Polypropylene oxide diol made from propylene oxide and dipropylene glycol and having a theoretical number average molecular weight of about 700 and a hydroxyl number of about 150.5.

Polyol 9—Polypropylene oxide-polyethylene oxide triol made from propylene oxide, ethylene oxide and glycerine and having a theoretical number average molecular weight of about 3600 and a hydroxyl number of about 46.7. Substantially all of the ethylene oxide units are disposed internally, i.e., substantially none of them form end units. Based on its total weight, the polyol contains about 14 wt-% $C_2H_4O$.

Polyol 10—Polypropylene oxide-polyethylene oxide triol made from propylene oxide, ethylene oxide and glycerine and having a theoretical number average molecular weight of about 3000 and a hydroxyl number of 56.4. Substantially all the ethylene oxide units are disposed internally, i.e., substantially none of them form end units. Based on its total weight, this polyol contains about 8 wt-% $C_2H_4O$.

Polyol 11—Polypropylene oxide diol made from propylene oxide and dipropylene glycol and having a theoretical number average molecular weight of about 4000 and a hydroxyl number of 28.

Polyol 12—A 50/50 blend on a weight basis of ethylene glycol and an adduct of 2.4 moles of ethylene oxide per mole of aniline, the adduct having a theoretical number average molecular weight of about 198 and a hydroxyl number of 565 and the blend having a theoretical number average molecular weight of about 95 and a hydroxyl number of 1180.

Polyol 13—Dipropylene glycol.

Polyol 14—Polypropylene oxide diol made from propylene oxide and dipropylene glycol and having a theoretical number average molecular weight of about 400 and a hydroxyl number of 245.

FILTERABILITY

The preferred compositions of this invention are essentially free of polymer particles having diameters over 30 microns. A composition meets this criteria if over 99 wt-% of the composition passes successively through a 150-mesh screen and a 700-mesh screen in the following test. A 470 gram sample of the composition being tested is diluted with 940 grams of anhydrous isopropanol to reduce viscosity effects. The diluted sample is passed through a 2.4 square inch 150-mesh screen and then through a 2.4 square inch 700-mesh screen. (The screens are cleaned, dried and weighed before the test.) Then the screens are washed with isopropanol to remove any polyol, dried and weighed. The difference between the final and initial screen weights corresponds to the amount of polymer that did not pass through the screens. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Michigan. The amounts which pass through are reported in percent, a percentage of 100% being preferred. Trace solids will generally always be present, but a value of 100% indicates that over 99 weight percent passes through the screen.

CENTRIFUGIBLE SOLIDS (CS)

The polymer/polyol composition after stripping is centrifuged for about 24 hours at about 3000 revolutions per minute and 1470 radial centrifugal "g" force. Then the centrifuge tube is inverted and allowed to drain for four hours. The non-flowing cake remaining at the bottom of the tube is reported as wt-% of the initial weight of the composition tested. It is preferable that the centrifugible solids be as low as possible, preferably below 20%, more preferably below 10% and most preferably below 5%.

CLEAR LAYER BEFORE TIPPING (CLBT)

The polymer/polyol composition is placed in a small test tube and centrigued for about 24 hours after which time the liquid in the test tube is observed and the height of the clear layer on the top is measured. This height is given as a percentage of the height of the liquid in the test tube. It is preferable that the CLBT be as low as possible, e.g., as close to 0 as possible.

EXAMPLES 1-60 AND A-OOO

Examples 1 through 60 and A through OOO were conducted continuously in a 550 cubic centimeter continuously stirred tank reactor fitted with baffles and an impeller generally run at 800 rpm. The feed components were pumped to the reactor continuously after going through an inline mixer to assure complete mixing of the feed components before entering the reactor. The internal temperature of the reactor was controlled to within one degree Centigrade by applying controlled heating or cooling to the outside of the reactor. The product from the reactor flowed out through a back pressure regulator. [The regulator was adjusted to give 10 pounds per square inch gauge back pressure in the reactor.] Then the product flowed through a water cooled tubular heat exchanger to a product receiver. Portions of the crude product were vacuum stripped at 2 millimeters pressure and 120° to 130° C. for testing. Conversions were determined from gas chromatic analysis of the amount of unreacted monomers present in the crude product before stripping.

The reaction conditions and results of these Examples are tabulated in Tables I through XV presented hereinafter.

TABLE I

| Example | A | B | C | 1 | 2 |
|---|---|---|---|---|---|
| Polyol or Polyol-PPPBlend | 1 | 4 | 4 | 4/Ex.A | 4/Ex.B |
| Ratio Polyol to PPP, wt-% | 100/0 | 100/0 | 100/0 | 95/5 | 90/10 |
| Reaction Temperature, °C. | 130 | 140 | 130 | 130 | 130 |
| Residence Time, min. | 12 | 12 | 12 | 12 | 12 |
| TBPO, wt-% in total feed | 1.0 | 1.0 | 1.0 | 1.0 | 1.0 |
| Monomer Content in Feed, wt-% | 23.03 | 23.18 | 20.21 | 20.36 | 20.44 |
| A/S in Feed | 80/20 | 80/20 | 40/60 | 40/60 | 40/60 |
| Polyol + TBPO Feed Rate, gm/hr | 2146 | 2174 | 2227 | 2198 | 2226 |
| Monomer Feed Rate, gm/hr | 642 | 656 | 564 | 562 | 572 |
| Product wt, gm/hr | 2784 | 2820 | 2787 | 2748 | 2786 |
| Material Balance, % | 99.86 | 99.65 | 99.86 | 99.57 | 99.57 |
| Residual A, % | 1.60 | 1.79 | 0.90 | 1.42 | 1.45 |
| Residual S, % | 0.15 | 0.20 | 1.37 | 2.15 | 2.35 |
| Conversions, A, % | 91.33 | 90.38 | 88.97 | 82.64 | 82.34 |
| Conversions, S, % | 96.74 | 95.70 | 88.80 | 82.48 | 80.92 |
| Conversions, Combined, % | 92.41 | 91.45 | 88.87 | 82.54 | 81.49 |
| Total Poly A* | 17.12 | 17.10 | 7.36 | 6.98 | 7.00 |
| Total Poly S* | 4.53 | 4.53 | 11.01 | 10.45 | 10.32 |
| Total New Polymer* | 21.65 | 21.63 | 18.37 | 17.43 | 17.32 |

TABLE I-continued

| Example | A | B | C | 1 | 2 |
|---|---|---|---|---|---|
| Total Polymer in Feed, wt-% of product | 0 | 0 | 0 | 0.89 | 1.72 |
| Total Polymer* | 21.65 | 21.63 | 18.37 | 18.32 | 19.04 |
| Product Properties | | | | | |
| Viscosity | 2492 | 1480 | 1768 | 2056 | 2280 |
| Cal. OH No. | 28.13 | 43.42 | 45.22 | 44.62 | 44.81 |
| Light Transmission, % | 81.0 | 77.0 | 50.5 | 50.5 | 50.5 |
| Filterability | | | | | |
| 150-Mesh Screen, % through | 100 | 100 | 100 | 100 | 100 |
| , solids on screen, ppm | 20 | 6 | 12 | 6 | 5 |
| 700-Mesh Screen, time, sec. | 226 | 170 | 190 | 500 | 1000 |
| , % through | 100 | 100 | 100 | 25.6 | 30.43 |
| , solids on screen, ppm | 26 | 9 | 12 | 49 | 37 |
| CS | 1.44 | 2.0 | 9.15 | 4.04 | 5.45 |
| CLBT | 0 | 1 | 2 | 1 | 1 |

*In product by calculation, wt-%

In Table I, the data for the centrifugible solids (CS) clearly show the improvement in dispersion stability by the use of a preformed polymer/polyol in accordance with this invention. Comparing the centrifugible solids of Example C in which no preformed polymer/polyol was used with the centrifugible solids of Examples 1 and 2 in which the preformed polymer/polyol of Examples A and B, respectively, was used, it is seen that the centrifugible solids was reduced from 9.15 wt-% in Example C down to 4.04 and 5.45 wt-% in Examples 1 and 2, respectively.

TABLE II

| Example | D | E | F |
|---|---|---|---|
| Polyol | 2 | 2 | 3 |
| Reaction Temp., °C. | 125 | 125 | 130 |
| Residence Time, min. | — | 18 | 17 |
| Cat. Type | VAZO-Γ | VAZO | TBPO |
| Cat. Conc., wt % in feed | 0.4 | 1.2 | 2.78 |
| Monomer Content in Feed, wt % (1) | — | 27.0 | 25.94 |
| A/S in Feed | 100/0 | 100/0 | 78/22 |
| Polyol Feed Rate, gm/hr (2) | — | 1333 | 1462 |
| Monomer Feed Rate, gm/hr (1) | — | 493 | 512 |
| Product wt., gm/hr | — | 1817 | 1965 |
| Material Balance, % | — | 99.51 | 99.54 |
| Residual A, % | — | 2.22 | 1.59 |
| Residual S, % | — | — | 0.29 |
| Residual TMSN, % | — | 0.58 | — |
| Conversions, A, % | — | 91.44 | 92.18 |
| Conversions, S, % | — | — | 94.94 |
| Conversions, Combined, % | — | 91.44 | 92.78 |
| Total Poly A* | 16.62 | 24.16 | 19.00 |
| Total Poly S* | — | — | 5.52 |
| Total Polymer* | 16.62 | 24.16 | 24.52 |
| Product Properties | | | |
| Viscosity | 3330 | 6840 | 18,700 |
| Light Transmission, % | — | 87.0 | 92.0 |
| Calc. OH No. | 23.5 | 21.57 | 22.30 |
| Filterability | | | |
| 150-Mesh Screen, % through | — | 100 | 100 |
| , solids on screen, ppm | — | 8 | 21 |
| 700-Mesh Screen, time, sec. | — | 270 | 216 |
| , % through | — | 100 | 100 |
| , solids on screen, ppm | — | 3 | 25 |
| CS, wt % | — | 2.88 | 4.02 |
| CLBT, % | — | 0 | 0 |

| Example | G | H | I | J | K |
|---|---|---|---|---|---|
| Polyol | 2 | 2 | 2 | 3 | 3 |
| Reaction Temperature, °C. | 130 | 130 | 130 | 125 | 125 |
| Residence Time, min. | 12 | 18 | 17 | 20 | 19 |
| Cat. Type | VAXO-64 | TBPO | TBPO | VAZO-64 | VAZO-64 |
| Cat. Conc., wt % in total feed | 1.0 | 2.4 | 2.4 | 1.0 | 1.17 |
| Monomer Content in Feed, wt % (1) | 28.53 | 27.51 | 23.64 | 20.25 | 24.59 |
| A/S in Feed | 50/50 | 40/60 | 40/60 | 40/60 | 40/60 |
| Polyol Feed Rate, gm/hr (2) | 1974 | 1320 | 1473 | 1331 | 1328 |
| Monomer Feed Rate, gm/hr (1) | 788 | 501 | 456 | 338 | 433 |
| Product Wt., gm/hr | 2763 | 1811 | 1925 | 1664 | 1759 |
| Material Balance, % | 100.04 | 99.45 | 99.79 | 99.70 | 99.89 |
| Residual A, % | 1.26 | 0.80 | 0.79 | 0.78 | 0.87S |
| Residual S, % | 0.72 | 0.79 | 0.64 | 1.16 | 1.12 |
| Residual TMSN, % | 0.41 | — | — | 0.45 | 0.48 |
| Conversions, A, % | 90.84 | 92.77 | 91.66 | 89.92 | 90.72 |
| Conversins, S, % | 94.77 | 95.24 | 95.50 | 90.00 | 92.03 |
| Conversions, Combined % | 92.80 | 94.25 | 93.96 | 89.97 | 91.51 |
| Total Poly A* | 12.77 | 10.37 | 8.79 | 7.08 | 8.68 |
| Total Poly S* | 13.32 | 15.97 | 13.74 | 10.63 | 13.21 |
| Total Polymer* | 26.09 | 26.34 | 22.53 | 17.71 | 21.89 |

TABLE II-continued

| Product Properties | | | | | |
|---|---|---|---|---|---|
| Viscosity | 4520 | 9280 | 6100 | 2652 | 3060 |
| Light Transmission, % | 53.0 | 63 | 76.2 | 53.2 | 51.2 |
| Calc. OH No. | 19.36 | 19.93 | 20.96 | 24.11 | 22.89 |
| Filterability | | | | | |
| 150-Mesh Screen, % through | 100 | 100 | 100 | 100 | 100 |
| , solids on screen, ppm | 40 | 17 | 16 | 8 | 7 |
| 700-Mesh Screen, time, sec. | 234 | 340 | 342 | 390 | 324 |
| , % through | 100 | 100 | 100 | 100 | 100 |
| , solids on screen, ppm | 22 | 16 | 36 | 11 | 26 |
| CS | 2.34 | 2.64 | 2.79 | 2.71 | 2.11 |
| CLBT | 0 | 0 | 0 | 0 | 0 |

*In product by calculation, wt. %.
(1) In those examples using VAZO-64, monomer contents and monomer feed rates include the catalyst.
(2) In those examples using TBPO, polyol feed rates include the catalyst.

The preparations described in Table II illustrate the preparations of preformed polymer/polyols for use according to this invention in the examples of Tables III–VI.

TABLE III

| Example | L | M | N | O | P | Q |
|---|---|---|---|---|---|---|
| Polyol or Polyol-PPP Blend or Polyol Blend | 5 | 7 | 6 | 5 | 5 | 6 |
| Ratio Polyol to PPP or HMW Polyol | 100/0 | 100/0 | 100/0 | 100/0 | 100/0 | 100/0 |
| Reaction Temperature, °C. | 125 | 125 | 125 | 130 | 130 | 130 |
| Residence Time, min. | 12 | 12 | 12 | 12 | 12 | 16 |
| Cat. Type | VAZO-64 | VAZO-64 | VAZO-64 | TBPO | TBPO | TBPO |
| Cat. Conc., wt-% in total feed | 1.2 | 1.2 | 1.2 | 1.0 | 1.0 | 1.0 |
| Monomer Content in feed wt-%(1) | 22.89 | (1) | 23.38 | 18.25 | 12.38 | |
| A/S in Feed | 100/0 | 100/0 | 100/0 | 100/0 | 100/0 | 100.0 |
| Polyol Feed Rate, gm/hr (2) | 2169 | 2162 | 2142 | 2130 | 2276 | 1755 |
| Monomer Feed Rate, gm/hr (1) | 615 | 612 | 636 | 650 | 508 | 248 |
| Product Wt., gm/hr | 2781 | 2759 | 2740 | 2764 | 2760 | 2004 |
| Material Balance, % | 99.89 | 99.46 | 98.63 | 99.42 | 99.14 | 100.05 |
| Residual A, % | 2.58 | 3.27 | 3.56 | 4.78 | 3.67 | 3.59 |
| Residual TMSN, % | 0.48 | 0.49 | 0.50 | — | — | — |
| Conversions, Acrylonitrile, % | 87.66 | 84.41 | 83.79 | 79.67 | 80.06 | 70.99 |
| Total New Poly A* | 18.82 | 18.23 | 18.82 | 19.56 | 15.16 | 9.12 |
| Total New Polymer* | 18.82 | 18.23 | 18.82 | 19.56 | 15.16 | 9.12 |
| Total Polymer in Feed by Calc., Wt:% of product | 0 | 0 | 0 | 0 | 0 | 0 |
| Total Polymer* | 18.82 | 18.23 | 18.82 | 19.56 | 15.16 | 9.12 |
| Product Properties | | | | | | |
| Viscosity | 1748 | 2288 | 800 | 1940 | 1014 | 390 |
| Calc. OH No. | 45.42 | 88.88 | 91.40 | 44.81 | 47.26 | 101.33 |
| Light Transmission, % | 74.5 | 82.2 | 90.0 | — | — | — |
| Filterability | | | | | | |
| 150-Mesh Screen, % through | 100 | 100 | 100 | 100 | 100 | 100 |
| , solids on screen, ppm | 31 | 54 | 296 | 13 | 27 | 33 |
| 700-Mesh Screen, time, sec. | 230 | 180 | 900 | 192 | 188 | 500 |
| , % through | 100 | 100 | 36.5 | 100 | 100 | 36.52 |
| , solids on screen, ppm | 15 | 49 | 533 | 8 | 19 | 45 |
| CS, wt % | 8.33 | 61.17 | 57.98 | 25.8 | 7.48 | 34.31 |
| CLBT, % | 2 | 40 | 46 | 4 | 3 | 72 |

| Example | R | 3 | S | 4 | 5 |
|---|---|---|---|---|---|
| Polyol or Polyol-PPP Blend or Polyol Blend | 7/2 | 7/Ex.E | 6/2 | 6/Ex.D | 6/Ex.D |
| Ratio Polyol to PPP or HMW Polyol | 80/20 | 80/20 | 90/10 | 90/10 | 85/15 |
| Reaction Temperature, °C. | 125 | 125 | 125 | 125 | 125 |
| Residence Time, min. | 12 | 12 | 12 | 12 | 12 |
| Cat. Type | VAZO-64 | VAZO-64 | VAZO-64 | VAZO-64 | VAZO-64 |
| Cat. Conc., wt-% in total feed | 1.2 | 1.2 | 1.2 | 1.2 | 1.2 |
| Monomer Content in Feed, wt-% | 22.54 | 22.0 | 22.43 | 22.50 | 22.38 |
| A/S in Feed | 100/0 | 100/0 | 100/0 | 100/0 | 100/0 |
| Polyol Feed Rate, gm/hr | 2213 | 2223 | 2158 | 2156 | 2164 |
| Monomer Feed Rate, gm/hr | 644 | 627 | 624 | 626 | 624 |
| Product Wt., gm/hr | 2840 | 2844 | 2774 | 2770 | 2758 |
| Material Balance, % | 99.40 | 99.79 | 99.71 | 99.57 | 98.92 |
| Residual A, % | 2.71 | 2.63 | 2.78 | 2.65 | 2.83 |
| Residual TMSN, % | 0.54 | 0.61 | 0.49 | 0.47 | 0.55 |
| Conversions, A, % | 87.37 | 87.39 | 86.93 | 87.60 | 86.77 |
| Total New Poly A* | 19.17 | 18.69 | 18.99 | 19.17 | 18.92 |
| Total New Polymer* | 19.17 | 18.69 | 18.99 | 19.17 | 18.92 |
| Total Polymer in Feed by Calc. wt-% of product | 0 | 3.87 | 0 | 1.30 | 1.95 |
| Total Polymer* | 19.17 | 22.56 | 18.99 | 20.47 | 20.87 |
| Product Properties | | | | | |
| Viscosity | 1520 | 2100 | 1172 | 1168 | 1020 |

TABLE III-continued

| | | | | | |
|---|---|---|---|---|---|
| Calc. OH No. | 74.66 | 74.21 | 81.15 | 80.68 | 77.44 |
| Light Transmission, % | 79.8 | 80.5 | 72.8 | 68.5 | 78.8 |
| Filterability | | | | | |
| 150-Mesh Screen, % through | 100 | 100 | 100 | 100 | 100 |
| , solids on screen, ppm | 50 | 55 | 11 | 15 | 16 |
| 700-Mesh Screen, time, sec. | 180 | 170 | 150 | 151 | 154 |
| , % through | 100 | 100 | 100 | 100 | 100 |
| , solids on screen, ppm | 54 | 14 | 7 | 11 | 12 |
| CS, wt % | 3.05 | 2.52 | 20.36 | 16.08 | 7.66 |
| CLBT, % | 2 | 2 | 4 | 4 | 4 |

* In product by calculation, wt. %.
(1) In those examples using VAZO-64, monomer contents and monomer feed rate include the catalyst.
(2) In those examples using TBPO, polyol feed rates include the catalyst.

In Table III, the data show improved dispersion stability is obtained for polymer/polyol compositions made with preformed polymer/polyols according to this invention, Examples 3, 4 and 5, as compared to polymer/polyols made by earlier techniques Examples L–Q and those made with polyol blends, Examples R and S. A comparison of the centrifugible solids (CS) of Example S with Example 4 illustrates the improvement in dispersion stability in using the preformed polymer/polyol pursuant to this invention and with Example 5 illustrates the further improvement in dispersion stability by modestly increasing the preformed polymer/polyol content.

TABLE IV

| Example | T | U | V | W |
|---|---|---|---|---|
| Polyol or Polyol-PPP Blend or Polyol Blend | 6 | 6 | 6 | 6/3 |
| Ratio Polyol to PPP or HMW Polyol | 100/0 | 100/0 | 100/0 | 80/20 |
| Reaction Temperature, °C. | 120 | 130 | 125 | 120 |
| Residence Time, min. | 12 | 12 | 12 | 12 |
| Cat. Type | VAZO-64 | TBPO | VAZO-64 | VAZO-64 |
| Cat. Conc., wt-% in total feed | 0.44 | 1.0 | 0.5 | 0.46 |
| Monomer Content in Feed wt-% (1) | 7.7 | 20.45 | 20.32(3) | 23.34 |
| A/S in Feed | 80/20 | 80/20 | 80/20 | 78/22 |
| Polyol Feed Rate, gm/hr (2) | 2498 | 2210 | 2188 | 2128 |
| Monomer Feed Rate, gm/hr (1) | 210 | 568 | 558 | 648 |
| Product Wt., gm/hr | 2690 | 2768 | 2730 | 2744 |
| Material Balance, % | 99.30 | 99.64 | 99.42 | 98.85 |
| Residual A, % | 2.87 | 3.88 | 2.60 | 2.54 |
| Residual S, % | 0.24 | 0.48 | 0.35 | 0.42 |
| Residual TMSN, % | 0.16 | — | 0.06 | 0.16 |
| Conversions, A, % | 51.3 | 76.36 | 83.69 | 85.93 |
| Conversions, S, % | 83.7 | 88.30 | 91.21 | 91.76 |
| Conversions, Combined, % | 57.7 | 78.75 | 85.20 | 87.21 |
| Total New Poly A* | 3.1 | 13.06 | 13.67 | 15.81 |
| Total New Poly S* | 1.3 | 3.77 | 3.72 | 4.76 |
| Total New Polymer* | 4.4 | 16.83 | 17.39 | 20.57 |
| Total Polymer in Feed by Calc., wt-% of product | 0 | 0 | 0 | 0 |
| Total Polymer* | 4.4 (layered) | 16.83 | 17.39 | 20.57 |
| Viscosity | 246 | 610 | 520 | 588 |
| Calc. No. | 107.4 | 92.73 | 92.11 | 75.93 |
| Light Transmission, % | — | 59.5 | 72.0 | 62.3 |
| Filterability | | | | |
| 150-Mesh Screen, % through | 8.7 | 100 | 100 | 100 |
| , solids on screen, ppm | 2810 | 18 | 7 | 12 |
| 700-Mesh Screen, time, sec. | 1200 | 123 | 129 | 148 |
| , % through | 1.9 | 100 | 100 | 100 |
| , solids on screen, ppm | — | 21 | 10 | 40 |
| CS, wt % | 20.0 | 41.53 | 20.88 | 5.5 |
| CLBT, % | 84 | 8 | 2 | 4 |

| Example | X | 6 | 7 | 8 |
|---|---|---|---|---|
| Polyol or Polyol-PPP Blend or Polyol Blend | 8/3 | 8/Ex.F | 8/Ex.F | 8/Ex.F |
| Ratio of Polyol to PPP or HMW Polyol | 90/10 | 90/10 | 95/5 | 97/3 |
| Reaction Temperature, °C. | 125 | 125 | 125 | 125 |
| Residence Time, min. | 12.0 | 12.0 | 12.0 | 12.0 |
| Cat. Type | VAZO-64 | VAZO-64 | VAZO-64 | VAZO-64 |
| Cat. Conc., wt-% in total feed | 0.5 | 0.5 | 0.5 | 0.5 |
| Monomer Content in Feed, wt-% (1) | 20.20 | 20.60 | 20.47 | 20.17 |
| A/S in Feed | 78/22 | 78/22 | 78/22 | 78/22 |
| Polyol Feed Rate, gm/hr (2) | 2276 | 2200 | 2210 | 2220 |
| Monomer Feed Rate, gm/hr (1) | 576 | 573 | 569 | 561 |
| Product Wt., gm/hr | 2840 | 2764 | 2772 | 2766 |
| Material Balance, % | 99.58 | 99.67 | 99.82 | 99.46 |
| Residual A, % | 2.64 | 2.45 | 2.85 | 3.06 |
| Residual S, % | 0.38 | 0.42 | 0.39 | 0.43 |
| Residual TMSN, % | 0.59 | 0.28 | 0.21 | 0.19 |
| Conversions, A, % | 82.89 | 84.47 | 81.74 | 80.17 |
| Conversions, S, % | 91.27 | 90.56 | 91.14 | 90.12 |
| Conversions, Combined, % | 84.94 | 85.80 | 83.81 | 82.36 |
| Total New Poly A* | 13.14 | 13.68 | 13.17 | 12.75 |
| Total New Poly S* | 4.08 | 4.14 | 4.14 | 4.04 |

TABLE IV-continued

| | | | | |
|---|---|---|---|---|
| Total New Polymer* | 17.22 | 17.82 | 17.31 | 16.79 |
| Total Polymer in Feed by Calc., wt-% of product | 0 | 2.00 | 1.00 | 0.61 |
| Total Polymer* | 17.22 | 19.82 | 18.31 | 17.40 |
| Viscosity | 330 | 330 | 1096 | 1920 |
| Calc. OH No. | 114.57 | 113.14 | 119.11 | 122.02 |
| Light Transmission, % | 58.70 | 82.2 | 83 | 75.5 |
| Filterability | | | | |
| 150-Mesh Screen, % through | 100 | 100 | 100 | 100 |
| , solids on screen, ppm | 4 | 44 | 49 | 69 |
| 700-Mesh Screen, time, sec. | 120 | 120 | 600 | 600 |
| , % through | 100 | 100 | 0.4 | 1.28 |
| , solids on screen, ppm | 3 | 39 | 17,074 | 6582 |
| CS, wt-% | 16.74 | 2.13 | 60.94 | 66.83 |
| CLBT, % | 14 | 4 | 6 | 40 |

*In product by calculation, wt-%
(1) In those examples using VAZO-64, monomer contents and monomer feed rates include the catalyst.
(2) In those examples using TBPO, polyol feed rates include the catalyst.
(3) In addition, an amount of about 2 wt. % of the total feed of a copolymer stabilizer having an A/S ratio of 30/70 as an anchor portion and an acrylate as a soluble portion was used. The stabilizer was a waxy solid having, of course, a viscosity far in excess of 40,000 cps and was employed as a solution in suitable solvent.

In Table IV, the data illustrate the considerable improvement in dispersion stability of polymer/polyol compositions made with as little as 10% of a preformed polymer/polyol (Example 6) compared with earlier techniques (Examples T-X) including catalyst techniques (Examples T and U), preformed copolymer stabilizer (Example V) and polyol blends (Examples W and X). The data also illustrate the effects of the use of small amounts (5% and 3%) of preformed polymer/polyols (Examples 7 and 8), compared to Example T where worse results were achieved although higher molecular weight polyol and a lower percent of polymer were used.

TABLE V

| Example | Y | Z | AA | BB |
|---|---|---|---|---|
| Polyol or Polyol-PPP Blend or Polyol Blend | 9 | 9 | 9 | 9 |
| Ratio Polyol to PPP or HMW Polyol | 100/0 | 100/0 | 100/0 | 100/0 |
| Reaction Temperature, °C. | 125 | 125 | 130 | 128 |
| Residence Time, min. | 12 | 12 | 12 | 12 |
| Cat. Type | VAZO-64 | VAZO-64 | TBPO | TBPO |
| Cat. Con., wt-% in total feed | 0.4 | 0.5 | 1.0 | 0.8 |
| Monomer Content in Feed, wt-% (1) | 23.23 | 20.40 | 23.24 | 20.14 |
| A/S in Feed | 40/60 | 40/60 | 40/60 | 40/60 |
| Polyol Feed Rate, gm/hr (2) | 2128 | 2216 | 2120 | 2228 |
| Monomer Feed Rate, gm/hr (1) | 644 | 568 | 642 | 562 |
| Product Wt., gm/hr | 2766 | 2774 | 2764 | 2792 |
| Material Balance, % | 99.78 | 99.64 | 100.07 | 100.07 |
| Residual A, % | 1.16 | 1.45 | 1.34 | 1.19 |
| Residual S, % | 1.64 | 1.96 | 1.76 | 1.48 |
| Residual TMSN, % | 0.18 | 0.25 | — | — |
| Conversions, A, % | 87.33 | 81.85 | 85.58 | 85.22 |
| Conversions, S, % | 88.05 | 83.64 | 87.37 | 89.75 |
| Conversions, Combined, % | 87.76 | 82.93 | 86.65 | 86.74 |
| Total New Poly A* | 8.21 | 6.75 | 8.21 | 7.05 |
| Total New Poly S* | 12.41 | 10.35 | 12.58 | 10.90 |
| Total New Polymer* | 20.62 | 17.10 | 20.79 | 17.95 |
| Total Polymer in Feed by Calc., wt-% of product | 0 | 0 | 0 | 0 |
| Total Polymer* | 20.62 | 17.10 | 20.79 | 17.95 |
| Product Properties | | | | |
| Viscosity | 1668 | 1664 | 2900 | 1680 |
| Calc. OH No. | 36.67 | 38.71 | 36.60 | 39.79 |
| Light Transmission, % | 46.8 | 50.8 | 48.5 | 46.0 |
| Filterability | | | | |
| 150-Mesh Screen, % through | 41.5 | 100 | 100 | 100 |
| ,solids on screen, ppm | 28 | 12 | 7 | 12 |
| 700-Mesh Screen, time, sec. | 300 | 240 | 700 | 237 |
| , % through | 0.43 | 100 | 62.1 | 100 |
| , Solids on screen, ppm | 19,100 | 10 | 17 | 15 |
| CS, wt-% | 15.57 | 19.04 4.90 | 4.30 | |
| CLBT, % | 4 | 2 | 2 | 2 |

*In product by calculation, wt-%
(1) In those examples using VAZO-64, monomer contents and monomer feed rates include the catalyst.
(2) In those examples using TBPO, polyol feed rates include the catalyst.
(3) In addition, an amount of about 2 wt-% of the total feed of a copolymer stabilizer having an A/S ratio of 30/70 as an anchor portion and an "LB-3000" acrylate as a soluble portion was used.

| Example | CC | DD | EE |
|---|---|---|---|
| Polyol or Polyol-PPP Blend or Polyol Blend | 9/2 | 9/2 | 9 |
| Ratio of Polyol to PPP or HMW Polyol | 85/15 | 90/10 | 100/0 |
| Reaction Temperature, °C. | 125 | 125 | 125 |
| Residence Time, min. | 12 | 12 | 12 |
| Cat. Type | VAZO-64 | VAZO-64 | VAZO-64 |
| Cat. Conc., wt-% in total feed | 0.5 | 0.5 | 0.5 |
| Monomer Content in Feed, wt-% (1) | 20.20 | 19.92 | 23.18(3) |
| A/S in Feed | 40/60 | 40/60 | 40/60 |

TABLE V-continued

| | | | |
|---|---|---|---|
| Polyol Feed Rate, gm/hr (2) | 2217 | 2210 | 2108 |
| Monomer Feed Rate, gm/hr (1) | 561 | 550 | 636 |
| Product Wt., gm/hr 2769 | 2756 | 2732 | |
| Material Balance, % | 99.65 | 99.85 | 99.56 |
| Residual A, % | 1.25 | 1.34 | 1.16 |
| Residual S, % | 1.61 | 1.85 | 1.25 |
| Residual TMSN, % | 0.24 | 0.23 | 0.20 |
| Conversions, A, % | 84.2 | 82.79 | 87.27 |
| Conversions, Combined, % | 85.54 | 83.61 | 89.42 |
| Total New Poly A* | 6.84 | 6.65 | 8.14 |
| Total New Poly S* | 10.52 | 10.25 | 12.71 |
| Total New Polymer* | 17.36 | 16.80 | 20.85 |
| Product Properties | | | |
| Viscosity | 1620 | 1520 | 1440 |
| Calc. OH No. | 36.32 | 37.33 | 36.88 |
| Light Transmission, % | 46.3 | 47.0 | — |
| Filterability | | | |
| 150-Mesh Screen, % through | 100 | 100 | 100 |
| , solids on screen, ppm | 8 | 1 | 13 |
| 700-Mesh Screen, time, sec. | 231 | 225 | 330 |
| , % through | 100 | 100 | 100 |
| , solids on screen, ppm | 11 | 15 | 17 |
| CS, wt-% | 10.14 | 13.35 | 1.48 |
| CLBT, % | 4 | 2 | 0 |

*In product by calculation, wt-%
(1) In those examples using VAZO-64, monomer contents and monomer feed rates include the catalyst.
(2) In those examples using TBPO, polyol feed rates include the catalyst.
(3) In addition, an amount of about 2 wt-% of the total feed of a copolymer stabilizer having an A/S ratio of 30/70 as an anchor portion and an acrylate as a soluble portion was used. The stabilizer had a viscosity far above 40,000 cps and was used as a solution dissolved in a suitable organic solvent.

| Example | 9 | 10 | 11 | 12 |
|---|---|---|---|---|
| Polyol or Polyol-PPP Blend or Polyol Blend | 9/Ex.H | 9/Ex.H | 9/Ex.H | 9/Ex.I |
| Ratio of Polyol to ppp or HMW Polyol | 85/15 | 90/10 | 95/5 | 85/15 |
| Reaction Temperature, ° C. | 125 | 125 | 125 | 125 |
| Residence Time, min. | 12 | 12 | 12 | 12 |
| Cat. Type | VAZO-64 | VAZO-64 | VAZO-64 | VAZO-64 |
| Cat. Conc., wt-% in total feed | 0.5 | 0.5 | 0.5 | 0.46 |
| Monomer Content in Feed, wt-% (1) | 20.68 | 20.60 | 20.50 | 18.77 |
| A/S in Feed | 40/60 | 40/60 | 40/60 | 40/60 |
| Polyol Feed Rate, gm/hr (2) | 2201 | 2193 | 2202 | 2476 |
| Monomer Feed Rate, gm/hr (1) | 574 | 569 | 568 | 572 |
| Product Weight, gm/hr | 2764 | 2759 | 2760 | 3046 |
| Material Balance, % | 99.60 | 99.89 | 99.64 | 99.93 |
| Residual A, % | 1.08 | 1.14 | 1.13 | 1.13 |
| Residual S, % | 1.67 | 1.67 | 1.69 | 1.66 |
| Residual TMSN, % | 0.26 | 0.26 | 0.22 | 0.23 |
| Conversion, A, % | 86.67 | 85.84 | 85.93 | 84.58 |
| Conversion, S, % | 86.26 | 86.17 | 85.97 | 84.90 |
| Conversion, Combined, % | 86.43 | 86.03 | 85.95 | 84.77 |
| Total New Poly A* | 7.20 | 7.10 | 7.08 | 6.37 |
| Total New Poly S* | 10.74 | 10.70 | 10.62 | 9.60 |
| Total New Polymer* | 17.94 | 17.80 | 17.70 | 15.97 |
| Total Polymer in Feed by Calc., wt-% of product | 3.22 | 2.15 | 1.08 | 2.82 |
| Total Polymer* | 21.16 | 19.95 | 18.78 | 18.79 |
| Product Properties | | | | |
| Viscosity | 1580 | 1380 | 1310 | 1304 |
| Calc. OH No. | 35.03 | 36.19 | 37.33 | 35.99 |
| Light Transmission, % | 59.3 | 56.3 | 47.0 | 64.8 |
| Filterability | | | | |
| 150-Mesh Screen, % through | 100 | 100 | 100 | 100 |
| , solids on screen, ppm | 8 | 10 | 7 | 25 |
| 700-Mesh Screen, time, sec. | 203 | 184 | 178 | 240 |
| , % through | 100 | 100 | 100 | 100 |
| , solids on screen, ppm | 11 | 9 | 10 | 8 |
| CS, wt-% | 1.49 | 1.50 | 1.67 | 1.39 |
| CLBT, % | 0 | 0 | 0 | 0 |

*In product by calculation, wt-%
(1) In those examples using VAZO-64, monomer feed rates include the catalyst.
(2) In those examples using TBPO, polyol feed rates include the catalyst.

In Table V, the data show the improvement of using preformed polymer/polyols (Examples 9-12) in providing highly stable polymer/polyol compositions as compared to earlier techniques (Examples Y-DD) and shows equivalent high dispersion stability compared to an exceptional earlier technique (Example EE). The data also show the exceptional effectiveness of a small amount of preformed polymer/polyol (5%-Example 11) in providing exceptionally high dispersion stability. Comparing Example CC with Examples 9 and 12, replacement of 15 wt-% of the base polyol with an equal weight of preformed polymer/polyol dropped the centrifugible solids from about 10 wt-% to about 1.49 or 1.39 wt-%. Comparing it with Examples 10 and 11 shows that even as little as 10 or 5 wt-% replacement provides essentially the same improvement in dispersion stability.

TABLE VI

| Example | FF | GG | HH | II |
|---|---|---|---|---|
| Polyol or Polyol-PPP Blend or Polyol Blend | 10/3 | 10/3 | 10 | 10 |
| Ratio of Polyol to PPP or HMW Polyol | 80/20 | 80/20 | 100/0 | 100/0 |
| Reaction Temperature, °C. | 125 | 125 | 125 | 125 |
| Residence Time, min. | 12 | 12 | 12 | 12 |
| Cat. Type | VAZO-64 | VAZO-64 | VAZO-64 | VAZO-64 |
| Cat. Conc., wt-% in total feed | 1.52 | 1.60 | 1.30 | 1.30 |
| Monomer Content in Feed, wt-% (1) | 30.72 | 32.00 | 43.13 (3) | 32.17 (3) |
| A/S in Feed | 40/60 | 40/60 | 40/60 | 40/60 |
| Polyol Feed Rate, gm/hr | 1935 | 1894 | 1622 | 1914 |
| Monomer Feed Rate, gm/hr (1) | 858 | 896 | 1230 | 908 |
| Product Wt., gm/hr | 2772 | 2786 | 2804 | 2786 |
| Material Balance, % | 99.25 | 99.86 | 98.32 | 98.72 |
| Residual A, % | 1.26 | 1.28 | 1.12 | 1.07 |
| Residual S, % | 1.50 | 1.41 | 1.09 | 1.25 |
| Residual TMSN, % | 0.65 | 0.70 | 0.65 | 0.65 |
| Conversions, A, % | 89.29 | 89.53 | 93.42 | 91.46 |
| Conversions, S, % | 91.50 | 92.31 | 95.73 | 93.34 |
| Conversions, Combined, % | 90.62 | 91.20 | 94.80 | 92.59 |
| Total New Poly A* | 10.74 | 11.25 | 16.00 | 11.59 |
| Total New Poly S* | 16.50 | 17.40 | 24.59 | 17.75 |
| Total New Polymer* | 27.24 | 28.65 | 40.59 | 29.34 |
| Total Polymer in Feed by Calc., wt-% of product | 0 | 0 | 0 | 0 |
| Total Polymer* | 27.24 | 28.65 | 40.59 | 29.34 |
| Product Properties | | | | |
| Viscosity | 1984 | 2140 | 11,960 | 3310 |
| Calc. OH No. | 38.90 | 38.14 | 33.50 | 39.85 |
| Light Transmission, % | 45.8 | 47.0 | 44.4 | 46.0 |
| Filterability | | | | |
| 150-Mesh Screen, % through | 100 | 100 | 100 | 100 |
| , solids on screen, ppm | 9 | 11 | 13 | 12 |
| 700-Mesh Screen, time, sec. | 1200 | 300 | 218 | 212 |
| , % through | 41.16 | 11.33 | 100 | 100 |
| , solids on screen, ppm | 24 | 35 | 14 | 13 |
| CS, wt-% | 12.61 | 15.71 | 5.56 | 2.51 |
| CLBT, % | 2 | 4 | 0 | 0 |

| Example | 13 | 14 | 15 | 16 | 17 |
|---|---|---|---|---|---|
| Polyol or Polyol-PPP Blend or Polyol Blend | 10/Ex.H | 10/Ex.K | 10/Ex.J | 10/Ex.J | 10/Ex.G |
| Ratio of Polyol to PPP or HMW Polyol | 80/20 | 80/20 | 80/20 | 90/10 | 80/20 |
| Reaction Temperature, °C. | 125 | 125 | 125 | 125 | 125 |
| Residence Time, min. | 12 | 12 | 12 | 12 | 12 |
| Cat. Type | VAZO-64 | VAZO-64 | VAZO-64 | VAZO-64 | VAZO-64 |
| Cat. Conc., wt-% in total feed | 1.0 | 1.0 | 1.0 | 1.0 | 1.0 |
| Monomer Content in Feed, wt-% (1) | 30.61 | 28.79 | 29.02 | 28.84 | 28.27 |
| A/S in Feed | 40/60 | 40/60 | 40/60 | 40/60 | 40/60 |
| Polyol Feed Rate, gm/hr | 1943 | 1976 | 1974 | 1979 | 1982 |
| Monomer Feed Rate, gm/hr (1) | 857 | 799 | 807 | 802 | 781 |
| Product Wt., gm/hr | 2787 | 2762 | 2772 | 2775 | 2756 |
| Material Balance, % | 99.53 | 99.53 | 99.68 | 99.78 | 99.75 |
| Residual A, % | 1.04 | 1.36 | 1.49 | 1.21 | 1.20 |
| Residual S, % | 1.36 | 1.60 | 1.84 | 1.51 | 1.41 |
| Residual TMSN, % | 0.29 | 0.40 | 0.49 | 0.48 | 0.60 |
| Conversions, A, % | 91.25 | 87.82 | 86.74 | 89.15 | 88.95 |
| Conversions, S, % | 92.38 | 90.45 | 89.08 | 90.98 | 91.35 |
| Conversions, Combined, % | 91.93 | 89.40 | 88.15 | 90.25 | 90.39 |
| Total New Poly A* | 11.08 | 10.06 | 10.06 | 10.21 | 9.91 |
| Total New Poly S* | 16.82 | 15.55 | 15.50 | 15.63 | 15.26 |
| Total New Polymer* | 27.90 | 25.61 | 25.56 | 25.84 | 25.17 |
| Total Polymer in Feed by Calc., wt-% of product | 3.75 | 3.21 | 2.60 | 1.30 | 3.85 |
| Total Polymer* | 31.65 | 28.82 | 28.16 | 27.14 | 29.02 |
| Product Properties | | | | | |
| Viscosity | 2204 | 1812 | 1760 | 1580 | 1880 |
| Calc. OH No. | 37.19 | 38.82 | 39.02 | 41.5 | 38.51 |
| Light Transmission, % | 57.00 | 43.8 | 45.0 | 44.4 | 44.5 |
| Filterability | | | | | |
| 150-Mesh Screen, % through | 100 | 100 | 100 | 100 | 100 |
| , solids on screen, ppm | 10 | 32 | 8 | 22 | 21 |
| 700-Mesh Screen, time, sec. | 1200 | 600 | 600 | 600 | 600 |
| , % through | 39.15 | 2.13 | 22.5 | 10 | 27 |
| , solids on screen, ppm | 33 | 1238 | 56 | 215 | 48 |
| CS, wt-% | 2.16 | 3.41 | 2.81 | 5.44 | 3.57 |
| CLBT, % | 0 | 2 | 2 | 2 | 0 |

*In product by calculation, wt-%
(1) In those examples using VAZO-64, monomer contents and monomer feed rates include the catalyst.
(3) In addition, an amount of about 2 wt-% of the total feed of a copolymer stabilizer having an A/S ratio of 30/70 as an anchor portion and an acrylate as a soluble portion was used. The stabilizer was a semi-solid having a viscosity far above 40,000 cps and was employed as a solution dissolved in a suitable organic solvent.

The data in Table VI show the effectiveness of the use of preformed polymer/polyols according to this invention in providing high dispersion stability in high polymer content compositions. A comparison of Example 13 with Examples GG and II illustrates that the polymer/polyol compositions made pursuant to this invention are superior in dispersion stability to those made with polyol blends (Example GG) and essentially equivalent to those made with the preformed copolymer stabilizer (Example II). In the latter case (Example II) the filterability is somewhat better although the viscosity is considerably higher than in Example 13.

TABLE VII

| Example | JJ | KK | LL | MM | NN | OO |
|---|---|---|---|---|---|---|
| Polyol | 2 | 1 | 4 | 1 | 3 | 2 |
| Reaction Temperature, °C. | 130 | 125 | 120 | 120 | 130 | 130 |
| Residence Time, min. | 12 | — | — | — | 20 | 12 |
| Cat. Type | TBPO | VAZO-64 | VAZO-64 | VAZO-64 | TBPO | TBPO |
| Cat. Conc., wt-% in feed | 2.4 | 0.4 | 0.4 | 0.4 | 1.0 | 2.4 |
| Monomer Content in Feed, wt-% (1) | 30.52 | — | — | — | 20.23 | 23.64 |
| A/S in Feed | 78/22 | 78/22 | 55/45 | 52.5/47.5 | 50/50 | 40/60 |
| Polyol Feed Rate, gm/hr (2) | 1912 | — | — | — | 1388 | 2100 |
| Monomer Feed Rate, gm/hr (1) | 840 | — | — | — | 352 | 650 |
| Product Wt., gm/hr | 2741 | — | — | — | 1734 | 2742 |
| Material Balance, % | 99.60 | — | — | — | 99.65 | 99.71 |
| Residual A, % | 1.38 | — | — | — | 1.34 | 0.79 |
| Residual S, % | 0.24 | — | — | — | 0.80 | 0.88 |
| Residual TMSN, % | — | — | — | — | — | — |
| Conversions, A, % | 94.23 | — | — | — | 86.80 | 91.67 |
| Conversions, S, % | 96.44 | — | — | — | 92.12 | 93.81 |
| Conversions, Combined, % | 94.71 | — | — | — | 89.46 | 92.95 |
| Total Poly A* | 22.80 | 21.19 | 10.08 | 12.44 | 8.97 | 8.81 |
| Total Poly S* | 6.58 | 7.14 | 8.78 | 9.91 | 9.52 | 13.53 |
| Total Polymer* | 29.38 | 28.33 | 18.86 | 22.35 | 18.49 | 22.34 |
| Product Properties | | | | | | |
| Viscosity | 22320 | 2950 | 1215 | 1860 | 3910 | 7240 |
| Calc. OH No. | 18.43 | 25.29 | 44.3 | 27.7 | 24.08 | 20.27 |
| Filterability | | | | | | |
| 150-Mesh Screen, % through | 100 | 100 | 100 | 100 | 100 | 100 |
| , solids on screen, ppm | 25 | 7 | 4 | 17 | 8 | 9 |
| 700-Mesh Screen, time, sec. | 260 | 223 | 215 | 420 | 305 | 252 |
| , % through | 100 | 100 | 100 | 100 | 100 | 100 |
| , solids on screen, ppm | 33 | 10 | 7 | 17 | 10 | 8 |
| CS, wt-% | 3.61 | 2.74 | 17.79 | 4.79 | 1.65 | 2.2 |
| CLBT, % | 0 | 0 | 2 | 2 | 0 | 0 |
| Light Transmission, % | 86.8 | — | — | — | 74.3 | 76.5 |

| Example | PP | QQ | RR | SS | TT | UU | VV |
|---|---|---|---|---|---|---|---|
| Polyol | 1 | 11 | 3 | 3 | 3 | 3 | 3 |
| Reaction Temperature, °C. | 130 | 130 | 130 | 130 | 130 | 125 | 125 |
| Residence Time, min. | 12 | 12 | 12 | 12 | 12 | 12 | 12 |
| Cat. Type | TBPO | TBPO | TBPO | TBPO | TBPO | VAZO-64 | VAZO-64 |
| Cat. Conc., wt-% in feed | 2.4 | 2.4 | 2.4 | 2.4 | 2.4 | 1.0 | 1.0 |
| Monomer Content in Feed, wt-% (1) | 23.43 | 23.05 | 25.62 | 23.57 | 22.53 | 24.71 | 24.75 |
| A/S in Feed | 40/60 | 40/60 | 40/60 | 30/70 | 30/70 | 30/70 | 25/75 |
| Polyol Feed Rate, mg/hr (2) | 2141 | 2153 | 2026 | 2111 | 2087 | 2051 | 2052 |
| Monomer Feed Rate, gm/hr (1) | 655 | 645 | 698 | 651 | 607 | 673 | 675 |
| Product Wt., gm/hr | 2785 | 2791 | 2713 | 2752 | 2683 | 2718 | 2720 |
| Material Balance, % | 99.61 | 99.75 | 99.60 | 99.64 | 99.59 | 99.78 | 99.74 |
| Residual A, % | 0.89 | 0.77 | 0.85 | 0.63 | 1.62 | 1.01 | 0.74 |
| Residual S, % | 1.06 | 0.91 | 0.81 | 1.56 | 4.35 | 3.28 | 3.36 |
| Residual TMSN, % | — | — | — | — | — | 0.64 | 0.46 |
| Conversions, A, % | 90.54 | 91.67 | 91.74 | 91.12 | 76.13 | 85.81 | 87.55 |
| Conversions, S, % | 92.49 | 93.44 | 94.75 | 90.58 | 72.53 | 80.25 | 81.16 |
| Conversions, Combined, % | 91.71 | 92.73 | 93.55 | 90.74 | 73.61 | 81.92 | 82.76 |
| Total Poly A* | 8.65 | 8.60 | 9.56 | 6.58 | 5.47 | 6.38 | 5.42 |
| Total Poly S* | 13.26 | 13.14 | 14.81 | 15.28 | 12.16 | 13.91 | 15.07 |
| Total Polymer* | 21.91 | 21.74 | 24.37 | 21.86 | 17.63 | 20.29 | 20.49 |
| Product Properties | | | | | | | |
| Viscosity | 3560 | 3700 | 7860 | 5500 | 5260 | 2870 | 3500 |
| Calc. OH No. | 28.27 | 21.91 | 22.16 | 22.89 | 24.13 | 23.35 | 23.30 |
| Filterability | | | | | | | |
| 150-Mesh Screen, % through | 100 | 100 | 100 | 100 | 100 | 100 | 100 |
| , solids on screen, ppm | 16 | 4 | 12 | 5 | 34 | 7 | 17 |
| 700-Mesh Screen, time, sec. | 180 | 249 | 254 | 269 | 323 | 314 | 1200 |
| , % through | 100 | 100 | 100 | 100 | 100 | 100 | 98.35 |
| , solids on screen, ppm | 4 | 4 | 57 | 4 | 24 | 104 | 11 |
| CS, wt-% | 0.98 | 1.89 | 2.35 | 2.19 | 2.15 | 3.49 | 6.94 |
| CLBT, % | 0 | 0 | 0 | 0 | 0 | 0 | 0 |
| Light Transmission, % | 70.0 | 70.5 | 77.0 | 71.8 | 72.0 | 39.0 | 41.0 |

*IN product by calculation, wt-%
(1) In those examples using VAZO-64, monomer contents and monomer feed rates include the catalyst.
(2) In those examples using TBPO, polyol feed rates include the catalyst.

The preparations described in Table VII illustrate the preparations of preformed polymer/polyols for use in accordance with this invention in the examples given in Tables VIII–XV.

The data of Table VIII indicate the advantages in utilizing a preformed polymer/polyol having a better dispersion stability than the final polymer/polyol com-

TABLE VIII

| Example | WW | 18 | 19 | 20 | XX | 21 |
|---|---|---|---|---|---|---|
| Polyol or Polyol-PPP Blend | 1 | 1/Ex.MM | 1/Ex.PP | 1/Ex.OO | 4 | 4/Ex.MM |
| Ratio of Polyol to PPP | 100/0 | 80/20 | 85/15 | 85/15 | 100/0 | 80/20 |
| Reaction Temperature, °C. | 120 | 120 | 125 | 125 | 125 | 125 |
| Residence Time, min. | 12 | 13 | 12 | 12 | 12 | 12 |
| Cat. Conc., wt-% in total feed (4) | 0.4 | 0.4 | 0.5 | 0.5 | 0.5 | 0.5 |
| Monomer Content in Feed, wt-% (4) | 23.19 | 22.29 | 23.34 | 23.60 | 20.57 | 17.55 |
| A/S in Feed | 52.5/47.5 | 52.5/47.5 | 40/60 | 40/60 | 50/50 | 50/50 |
| Polyol Feed Rate, gm/hr | 2113 | 1990 | 2131 | 2101 | 2216 | 2292 |
| Monomer Feed Rate, gm/hr (4) | 638 | 594 | 649 | 574 | 488 | |
| Product Wt., gm/hr | 2745 | 2586 | 2782 | 2742 | 2778 | 2768 |
| Material Balance, % | 99.78 | 100.08 | 100.07 | 99.71 | 99.57 | 99.57 |
| Residual A, % | 1.83 | 1.65 | 1.06 | 1.06 | 1.51 | 1.37 |
| Residual S, % | 1.11 | 0.90 | 1.60 | 1.65 | 1.13 | 1.03 |
| Residual TMSN, % | 0.21 | 0.25 | 0.26 | 0.27 | 0.27 | 0.25 |
| Conversions, A, % | 84.74 | 86.06 | 88.39 | 88.56 | 85.02 | 84.00 |
| Conversions, S, % | 89.77 | 91.59 | 88.33 | 88.13 | 88.79 | 87.97 |
| Conversions, Combined, % | 87.13 | 88.69 | 88.35 | 88.30 | 86.90 | 85.99 |
| Total New Poly A* | 10.45 | 10.46 | 8.30 | 8.76 | 7.34 | |
| Total New Poly S* | 10.02 | 10.08 | 12.45 | 12.56 | 9.15 | 7.69 |
| Total New Polymer* | 20.47 | 20.54 | 20.75 | 20.97 | 17.91 | 15.03 |
| Total Polymer in Feed by Calc., wt-% of product | 0 | 3.32 | 2.59 | 2.63 | 0 | 3.55 |
| Total Polymer* | 20.47 | 23.86 | 23.34 | 23.60 | 17.91 | 18.58 |
| Product Properties | | | | | | |
| Viscosity | 1904 | 2216 | 2080 | 2200 | 1040 | 1100 |
| Calc. OH No. | 28.63 | 27.41 | 27.61 | 26.58 | 45.72 | 42.56 |
| Filterability | | | | | | |
| 150-Mesh Screen, % through | 100 | 100 | 100 | 100 | 100 | 100 |
| , solids on screen, ppm | 13 | 13 | 38 | 24 | 5 | 6 |
| 700-Mesh Screen, time, sec. | 248 | 600 | 600 | 280 | 190 | 180 |
| , % through | 100 | 15.96 | 12.5 | 100 | 100 | 100 |
| , solids on screen, ppm | 6 | 115 | 92 | 8 | 6 | 12 |
| CS, wt-% | 5.48 | 5.36 | 2.18 | 1.88 | 10.38 | 7.26 |
| CLBT, % | 2 | 1 | 0 | 0 | 4 | 4 |
| Light Transmission, % | 44.3 | 48.5 | 53.8 | 60.0 | 47.0 | 49.0 |

| Example | 22 | 23 | 24 | 25 |
|---|---|---|---|---|
| Polyol-PPP Blend | 4/Ex.LL | 4/Ex.MM | 4/Ex.MM | 4/Ex.MM |
| Ratio of Polyol to PPP | 80/20 | 85/15 | 90/10 | 95/5 |
| Reaction Temperature, °C. | 125 | 125 | 125 | 125 |
| Residence Time, min. | 12 | 12 | 12 | 12 |
| Cat. Conc., wt-% in total feed (4) | 0.5 | 0.5 | 0.5 | 0.5 |
| Monomer Content in Feed, wt-% (4) | 17.58 | 19.10 | 18.74 | 20.03 |
| A/S in Feed | 50/50 | 50/50 | 50/50 | 50/50 |
| Polyol Feed Rate, gm/hr | 2278 | 2262 | 2264 | 2244 |
| Monomer Feed Rate, gm/hr (4) | 486 | 534 | 522 | 562 |
| Product Wt., gm/hr | 2744 | 2784 | 2785 | 2788 |
| Material Balance, % | 99.28 | 99.57 | 99.96 | 99.36 |
| Residual A, % | 1.44 | 1.33 | 1.37 | 1.32 |
| Residual S, % | 1.06 | 0.93 | 1.05 | 0.97 |
| Residual TMSN, % | 0.24 | 0.40 | 0.29 | 0.31 |
| Conversions, A, % | 83.26 | 81.04 | 84.98 | 86.54 |
| Conversions, S, % | 87.68 | 90.03 | 88.48 | 90.10 |
| Conversions, Combined, % | 85.47 | 85.54 | 86.73 | 88.32 |
| Total New Poly A* | 7.30 | 7.74 | 7.94 | 8.63 |
| Total New Poly S* | 7.68 | 8.60 | 8.27 | 8.99 |
| Total New Polymer* | 14.98 | 16.34 | 16.21 | 17.62 |
| Total Polymer in Feed by Calc., wt-% of product | 3.04 | 3.49 | 1.75 | 0.86 |
| Total Polymer* | 18.02 | 19.83 | 17.96 | 18.48 |
| Product Properties | | | | |
| Viscosity | 1052 | 1286 | 1174 | 1074 |
| Calc. OH No. | 45.41 | 43.08 | 44.32 | 44.73 |
| Filterability | | | | |
| 150-Mesh Screen, % through | 55.32 | 100 | 100 | 100 |
| , solids on screen, ppm | 60 | 14 | 19 | 10 |
| 700-Mesh Screen, time, sec. | 600 | 170 | 176 | 180 |
| , % through | 1.06 | 100 | 100 | 100 |
| , solids on screen, ppm | 3352 | 16 | 14 | 23 |
| CS, wt-% | 13.91 | 8.21 | 6.03 | 8.69 |
| CLBT, % | 4 | 4 | 4 | 4 |
| Light Transmission, % | 49 | 49 | 45 | 48.4 |

*In product by calculation, wt-%
(4) The catalyst used was VAZO-64 and monomer contents and feed rates include the catalyst.

position. Comparing the centrifugible solids of Examples WW and 18 illustrates a small improvement in dispersion stability. Where, however, as in Example 19, polyol composition can be made according to this invention having a better dispersion stability than that of the preformed polymer/polyol with which it is made.

TABLE IX

| Example | 26 | 27 | YY | 28 |
|---|---|---|---|---|
| Polyol-PPP Blend or Polyol Blend | 12/Ex.JJ | 13/Ex.F | 13/3 | 13/Ex.RR |
| Ratio of Polyol to PPP or HMW Polyol | 80/20 | 80/20 | 80/20 | 80/20 |
| Reaction Temperature, °C. | 125 | 125 | 123 | 125 |
| Residence Time, min. | 18 | 12 | 12 | 12 |
| Cat. Conc., wt-% in total feed (4) | 1.0 | 0.5 | 0.5 | 0.44 |
| Monomer Content in Feed, wt-% (4) | 18.79 | 20.38 | 20.35 | 20.57 |
| A/S in Feed | 78/22 | 78/22 | 78/22 | 40/60 |
| Polyol Feed Rate, gm/hr | 1543 | 2218 | 2246 | 2186 |
| Monomer Feed Rate, gm/hr (4) | 357 | 568 | 574 | 566 |
| Product Wt., gm/hr | 1882 | 2768 | 2808 | 2750 |
| Material Balance, % | 99.05 | 99.35 | 99.57 | 99.93 |
| Residual A, % | 2.98 | 4.73 | 5.06 | 3.18 |
| Residual S, % | 0.34 | 0.32 | 0.30 | 3.68 |
| Residual TMSN, % | 0.19 | — | 0.15 | — |
| Conversions, A, % | 78.74 | 69.71 | 67.47 | 60.54 |
| Conversions, S, % | 91.40 | 92.73 | 93.16 | 69.55 |
| Conversions, Combined, % | 81.53 | 74.77 | 73.12 | 65.95 |
| Total New Poly A* | 11.31 | 11.39 | 11.04 | 5.23 |
| Total New Poly S* | 3.70 | 4.27 | 4.30 | 9.02 |
| Total New Polymer* | 15.01 | 15.66 | 15.34 | 14.25 |
| Total Polymer in Feed by Calc., wt-% of product | 4.94 | 4.11 | 0 | 4.16 |
| Total Polymer* | 19.95 | 19.77 | 15.34 | 18.41 |
| Product Properties | | | | |
| Viscosity | 1240 | 726 | 400 | 570 |
| Calc. OH No. | 805.44 | 540.28 | 571.33 | 577.42 |
| Filterability | | | | |
| 150-Mesh Screen, % through | 69 | 100 | 100 | 100 |
| , solids on screen, ppm | 238 | 8 | 5 | 13 |
| 700-Mesh Screen, time, sec. | 225 | 600 | 146 | 271 |
| , % through | 0.83 | 27.45 | 100 | 100 |
| , solids on screen, ppm | 29157 | 101 | 8 | 19 |
| CS, wt-% | 59.12 | 12.00 | 13.78 | 20.57 |
| CLBT, % | 42 | 0 | 6 | 8 |
| Light Transmission, % | 77.0 | 82.2 | 57.5 | 37.5 |

*In product by calculation, wt-%
(4) The catalyst used was VAZO-64 and monomer contents and feed rates include the catalyst.

the preformed polymer/polyol is made with a better dispersion stability (0.98 wt-% CS as compared with 4.79 wt-% CS for the performed polymer/polyol of Example 18), the dispersion stability of the final polymer/polyol composition is considerably improved (2.18 wt-% CS for Example 19 as compared to 5.36 wt-% CS for Example 18). Comparison of Examples XX with Examples 21 and 23–25 illustrates the improvements in dispersion stability through the use of the preformed polymer/polyols. A comparison of Example LL with Example 22, however, illustrates that a final polymer/-

In Table IX, the data show the effect of preformed polymer/polyols in providing final polymer/polyol compositions from extremely low molecular weight base polyols. The dispersion stability of the compositions of Examples 26–28 can be further improved by increasing the amount of preformed polymer/polyol employed or by reducing the total polymer content. Example 28 is also exceptional in providing a way for manufacturing a polymer/polyol composition containing a 40/60 A/S copolymer in dipropylene glycol.

TABLE X

| Example | ZZ | 29 | 30 | 31 |
|---|---|---|---|---|
| Polyol-PPP Blend or Polyol Blend | 5/3 | 5/Ex.RR | 6/Ex.RR | 14/Ex.RR |
| Ratio of Polyol to PPP or HMW Polyol | 80/20 | 80/20 | 80/20 | 80/20 |
| Reaction Temperature, °C. | 120 | 120 | 125 | 125 |
| Residence Time, min. | 12 | 12 | 12 | 12 |
| Cat. Conc., wt-% in total feed (4) | 0.4 | 0.4 | 0.5 | 0.5 |
| Monomer Content in Feed, wt-% (4) | 20.45 | 21.58 | 20.94 | 21.29 |
| A/S in Feed | 40/60 | 40/60 | 40/60 | 40/60 |
| Polyol Feed Rate, gm/hr | 2194 | 2202 | 2220 | 2152 |
| Monomer Feed Rate, gm/hr (4) | 564 | 606 | 588 | 582 |
| Product Wt., gm/hr | 2748 | 2799 | 2793 | 2724 |
| Material Balance, % | 99.63 | 99.68 | 99.46 | 99.63 |
| Residual A, % | 1.45 | 1.02 | 1.11 | 1.75 |
| Residual S, % | 1.86 | 1.65 | 1.80 | 2.39 |
| Residual TMSN, % | 0.23 | 0.21 | 0.23 | 0.23 |
| Conversions, A, % | 81.98 | 87.99 | 86.49 | 79.01 |
| Conversions, S, % | 84.59 | 87.04 | 85.40 | 80.89 |
| Conversions, Combined, % | 83.55 | 87.42 | 85.83 | 80.14 |
| Total New Poly A* | 6.80 | 7.65 | 7.28 | 6.85 |
| Total New Poly S* | 10.53 | 11.36 | 10.78 | 10.52 |
| Total New Polymer* | 17.33 | 19.01 | 18.06 | 17.37 |
| Total Polymer in Feed by Calc., wt-% of product | 0 | 3.93 | 3.97 | 4.00 |
| Total Polymer* | 17.33 | 22.94 | 22.03 | 21.37 |
| Product Properties | | | | |
| Viscosity | 852 | 970 | 588 | 342 |

TABLE X-continued

| Example | ZZ | 29 | 30 | 31 |
|---|---|---|---|---|
| Calc. OH No. | 41.99 | 39.84 | 75.61 | 171.56 |
| Filterability | | | | |
| 150-Mesh Screen, % through | 100 | 100 | 100 | 100 |
| , solids on screen, ppm | 3 | 4 | 6 | 5 |
| 700-Mesh Screen, time, sec. | 185 | 175 | 195 | 161 |
| , % through | 100 | 100 | 100 | 100 |
| , solids on screen, ppm | 2 | 9 | 9 | 11 |
| CS, wt-% | 13.70 | 1.21 | 1.57 | 3.52 |
| CLBT, % | 5 | 0 | 0 | 0 |
| Light Transmission, % | 41.8 | 65.0 | 64.5 | 56 |

*In product by calculation, wt-%
(4) The catalyst used was VAZO-64 and monomer contents and feed rates include the catalyst.

The data in Table X show the usefulness of the present invention in producing polymer/polyol compositions of higher dispersion stability from low molecular weight base polyols as compared to the earlier technique using polyol blends.

techniques (Examples CCC and DDD). Examples 32 and 33 illustrate the potentially harmful effects of inhibitors present in Polyol 10. These effects were overcome by increasing the amount of catalyst (see Example 34). The table also illustrates the effect of an increased

TABLE XI

| Example | 32 | 33 | AAA | BBB | 34 | CCC | DDD |
|---|---|---|---|---|---|---|---|
| Polyol, Polyol-PPP Blend or Polyol Blend | 10/Ex.KK | 10/Ex.KK | 10/1 | 10 | 10/Ex.JJ | 10/2 | 10 |
| Ratio of Polyol to PPP or HMW Polyol | 90/10 | 95/5 | 95/5 | 100/0 | 85/15 | 85/15 | 100/0 |
| Reaction Temperature, °C. | 120 | 120 | 120 | 120 | 125 | 125 | 125 |
| Residence Time, min. | 12 | 12 | 12 | 12 | 12 | 12 | 12 |
| Cat. Conc., wt-% in total feed (4) | 0.4 | 0.4 | 0.4 | 0.4 | 0.7 | 0.7 | 0.7 |
| Monomer Content in Feed, wt-% (4) | 33.13 | 32.45 | 32.59 | 32.83 | 32.77 | 32.82 | 32.61 |
| A/S in Feed | 78/22 | 78/22 | 78/22 | 78/22 | 78/22 | 78/22 | 78/22 |
| Polyol Feed Rate, gm/hr | 1893 | 1894 | 1899 | 1890 | 1863 | 1875 | 1885 |
| Monomer Feed Rate, gm/hr (4) | 938 | 910 | 918 | 924 | 908 | 916 | 912 |
| Product Wt., gm/hr | 2831 | 2794 | 2806 | 2814 | 2756 | 2775 | 2789 |
| Material Balance, % | 100.0 | 99.64 | 99.61 | 100.0 | 99.46 | 99.43 | 99.71 |
| Residual A, % | 3.09 | 3.09 | 3.34 | 3.13 | 1.92 | 2.40 | 2.47 |
| Residual S, % | 0.54 | 0.52 | 0.58 | 0.50 | 0.34 | 0.41 | 0.43 |
| Residual TMSN, % | 0.19 | 0.20 | 0.23 | 0.22 | 0.34 | 0.32 | 0.33 |
| Conversions, A, % | 87.89 | 87.68 | 86.75 | 87.62 | 92.32 | 90.47 | 90.10 |
| Conversions, S, % | 92.50 | 92.65 | 91.84 | 92.99 | 95.21 | 94.22 | 93.89 |
| Conversions, Combined, % | 88.91 | 88.78 | 87.87 | 88.81 | 92.96 | 91.30 | 90.94 |
| Total New Poly A* | 23.29 | 22.75 | 22.67 | 23.01 | 23.64 | 23.33 | 23.11 |
| Total New Poly S* | 6.91 | 6.78 | 6.77 | 6.89 | 6.88 | 6.85 | 6.79 |
| Total New Polymer* | 30.20 | 29.53 | 29.44 | 29.90 | 30.52 | 30.18 | 29.90 |
| Total Polymer in Feed by Calc., wt-% of product | 1.97 | 0.99 | 0 | 0 | 3.03 | 0 | 0 |
| Total Polymer* | 32.17 | 30.52 | 29.44 | 29.90 | 33.55 | 30.18 | 29.90 |
| Product Properties | | | | | | | |
| Viscosity | 2628 | 2088 | 1876 | 1880 | 2800 | 2100 | 1752 |
| Calc. OH No. | 39.13 | 40.71 | 41.15 | 41.71 | 37.06 | 38.04 | 41.70 |
| Filterability | | | | | | | |
| 150-Mesh Screen, % through | 100 | 100 | 100 | 100 | 100 | 100 | 100 |
| , solids on screen, ppm | 35 | 64 | 5 | 5 | 32 | 16 | 8 |
| 700-Mesh Screen, time, sec. | 600 | 430 | 180 | 229 | 145 | 148 | 130 |
| , % through | 72.98 | 100 | 100 | 100 | 100 | 100 | 100 |
| , solids on screen, ppm | 21 | 35 | 9 | 8 | 67 | 19 | 13 |
| CS, wt-% | 18.79 | 34.88 | 18.84 | 14.35 | 1.76 | 4.39 | 5.94 |
| CLBT, % | 4 | 4 | 4 | 4 | 0 | 2 | 2 |
| Light Transmission, % | 62.0 | 67.5 | 58.8 | 58.2 | 78.0 | 56.5 | 60.0 |

*In product by calculation, wt-%
(4) The catalyst used was VAZO-a64 and monomer contents and feed rates include the catalyst.

The data in Table XI illustrate the improvement in dispersion stability derived by the use of a preformed polymer/polyol (Example 34) as compared to earlier amount of preformed polymer/polyol as well as selection of the particular preformed polymer/polyol on the dispersion stability of the final product.

TABLE XII

| Example | EEE | FFF | 35 | 36 | 37 |
|---|---|---|---|---|---|
| Polyol-PPP Blend or Polyol Blend | 10/3 | 10/3 | 10/Ex.RR | 10/Ex.RR | 10/Ex.J,K |
| Ratio of Polyol to PPP or HMW Polyol | 60/40 | 70/30 | 70/30 | 70/30 | 70/30 |
| Reaction Temperature, °C. | 125 | 125 | 125 | 125 | 125 |
| Residence Time, min. | 12 | 12 | 12 | 12 | 12 |
| Cat. Conc., wt-% in total feed (4) | 1.2 | 0.82 | 1.0 | 1.1 | 1.0 |
| Monomer Content in Feed, wt-% (4) | 36.49 | 36.02 | 31.34 | 34.26 | 32.23 |
| A/S in Feed | 40/60 | 40/60 | 40/60 | 40/60 | 40/60 |
| Polyol Feed Rate, gm/hr | 1763 | 1783 | 1893 | 1814 | 1892 |
| Monomer Feed Rate, gm/hr (4) | 1013 | 1004 | 864 | 939 | 900 |
| Product Wt., gm/hr | 2768 | 2779 | 2746 | 2741 | 2772 |
| Material Balance, % | 99.71 | 99.71 | 99.60 | 99.56 | 99.28 |

TABLE XII-continued

| Example | EEE | FFF | 35 | 36 | 37 |
|---|---|---|---|---|---|
| Residual A, % | 1.29 | 1.46 | 1.15 | 1.08 | 1.01 |
| Residual S, % | 1.40 | 1.60 | 1.59 | 1.52 | 1.56 |
| Residual TMSN, % | 0.58 | 0.42 | 0.59 | 0.59 | 0.66 |
| Conversions, A, T | 90.89 | 89.66 | 90.56 | 91.86 | 91.97 |
| Conversions, S, % | 93.41 | 92.43 | 91.30 | 92.36 | 91.73 |
| Conversions, Combined, % | 92.40 | 91.33 | 91.00 | 92.16 | 91.83 |
| Total New Poly A* | 13.20 | 13.03 | 11.31 | 12.47 | 11.81 |
| Total New Poly S* | 20.35 | 20.16 | 17.10 | 18.80 | 17.66 |
| Total New Polymer* | 33.55 | 33.19 | 28.41 | 31.27 | 29.47 |
| Total Polymer in Feed by Calc., wt-% of product | 0 | 0 | 5.17 | 4.95 | 4.21 |
| Total Polymer* | 33.55 | 33.19 | 33.58 | 36.22 | 33.68 |
| Product Properties | | | | | |
| Viscosity | 3560 | 3332 | 3030 | 3860 | 2812 |
| Calc. OH No. | 31.51 | 33.31 | 34.58 | 33.20 | 34.35 |
| Filterability | | | | | |
| 150-Mesh Screen, % through | 100 | 100 | 100 | 100 | 6.74 |
| , solids on screen, ppm | 18 | 17 | 20 | 15 | 347 |
| 700-Mesh Screen, time, sec. | 600 | 600 | 245 | 1200 | 200 |
| , % through | 9.5 | 34 | 100 | 90.66 | 0.35 |
| , solids on screen, ppm | 305 | 122 | 12 | 19 | 16413 |
| CS, wt-% | 12.14 | 18.70 | 1.70 | 2.08 | 5.07 |
| CLBT, % | 2 | 2 | 0 | 0 | 0 |
| Light Transmission, % | 40.2 | 47.4 | 61.0 | 60.0 | 44.5 |

*In product by calculation, wt-%
(4) The catalyst used as VAZO-64 and monomer contents and feed rates include the catalyst.

The data in Table XII illustrate the advantages of this invention over earlier techniques in improving dispersion stability of high polymer content compositions as shown by a comparison of the centrifugible solids CS for Examples FFF and 35–37.

TABLE XIII

| Example | GGG | 38 | 39 | 40 | 41 | HHH |
|---|---|---|---|---|---|---|
| Polyol-PPP Blend or Polyol Blend | 4/3 | 4/Ex.RR | 9/Ex.RR | 9/Ex.PP | 9/Ex.QQ | 9 |
| Ratio of Polyol to PPP or HMW Polyol | 80/20 | 80/20 | 85/15 | 85/15 | 85/15 | 100/0 |
| Reaction Temperature, °C. | 125 | 125 | 125 | 125 | 125 | 120 |
| Residence Time, min. | 12 | 12 | 12 | 12 | 12 | 12 |
| Cat. Conc., wt-% in total feed (4) | 0.5 | 0.5 | 0.5 | 0.5 | 0.5 | 1.3 |
| Monomer Content in Feed, wt-% (4) | 20.66 | 20.24 | 20.48 | 20.18 | 20.50 | 21.64 |
| A/S in Feed | 40/60 | 40/60 | 40/60 | 40/60 | 40/60 | 30/70 |
| Polyol Feed Rate, gm/hr | 2200 | 2222 | 2236 | 2286 | 2242 | 2220 |
| Monomer Feed Rate, gm/hr (4) | 573 | 564 | 576 | 578 | 578 | 613 |
| Product Wt., gm/hr | 2760 | 2780 | 2808 | 2868 | 2824 | — |
| Material Balance, % | 99.53 | 99.78 | 99.86 | 100.0 | 100.14 | Run not completed—reactor plugged |
| Residual A, % | 1.09 | 0.94 | 1.05 | 1.14 | 1.21 | |
| Residual S, % | 1.14 | 1.62 | 1.60 | 1.81 | 1.67 | |
| Residual TMSN, % | 0.20 | 0.25 | 0.22 | 0.25 | 0.24 | |
| Conversions, A, % | 86.54 | 88.13 | 86.88 | 85.52 | 84.85 | |
| Conversions, S, % | 90.62 | 86.36 | 86.67 | 84.68 | 86.06 | |
| Conversions, Combined, % | 88.99 | 87.06 | 86.76 | 85.02 | 85.58 | |
| Total New Poly A* | 7.14 | 7.15 | 7.14 | 6.94 | 6.99 | |
| Total New Poly S* | 11.21 | 10.51 | 10.68 | 10.31 | 10.64 | |
| Total New Polymer* | 18.35 | 17.66 | 17.82 | 17.25 | 17.63 | |
| Total Polymer in Feed by Calc., wt-% of product | 0 | 3.99 | 2.99 | 2.70 | 2.67 | |
| Total Polymer* | 18.35 | 21.65 | 20.81 | 19.95 | 20.30 | |
| Product Properties | | | | | | |
| Viscosity | 1264 | 1332 | 1456 | 1320 | 1344 | |
| Calc. OH No. | 41.16 | 41.59 | 35.35 | 36.35 | 35.40 | |
| Filterability | | | | | | |
| 150-Mesh Screen, % through | 100 | 100 | 100 | 100 | 100 | |
| , solids on screen, ppm | 8 | 7 | 4 | 33 | 9 | |
| 700-Mesh Screen, time, sec. | 217 | 181 | 184 | 223 | 218 | |
| , % through | 100 | 100 | 100 | 100 | 100 | |
| , solids on screen, ppm | 3 | 6 | 80 | 28 | 9 | |
| CS, wt-% | 6.25 | 1.31 | 1.35 | 1.59 | 1.51 | |
| CLBT, % | 2 | 0 | 0 | 0 | 0 | |
| Light Transmission, % | 40.0 | 63.0 | 61.5 | 56.0 | 59.7 | |

| Example | III | 42 | 43 | JJJ | 44 | KKK |
|---|---|---|---|---|---|---|
| Polyol-PPP Blend or Polyol Blend | 9/3 | 9/Ex.NN | 9/Ex.SS | 9/3 | 9/Ex.SS | 9/3 |
| Ratio of Polyol to PPP or HMW Polyol | 80/20 | 75/25 | 80/20 | 80/20 | 80/20 | 80/20 |
| Reaction Temperature, °C. | 125 | 125 | 125 | 123 | 125 | 120 |
| Residence Time, min. | 12 | 12 | 12 | 12 | 12 | 12 |
| Cat. Conc., wt-% in total feed (4) | 1.3 | 1.3 | 1.3 | 1.3 | 1.3 | 1.3 |
| Monomer Content in Feed, wt-% (4) | 21.21 | 21.28 | 21.43 | 21.58 | 21.13 | 21.70 |
| A/S in Feed | 30/70 | 30/70 | 30/70 | 25/75 | 25/75 | 20/80 |
| Polyol Feed Rate, gm/hr | 2192 | 2220 | 2192 | 2180 | 2221 | 2165 |

TABLE XIII-continued

| | | | | | | |
|---|---|---|---|---|---|---|
| Monomer Feed Rate, gm/hr (4) | 590 | 600 | 598 | 600 | 595 | 600 |
| Product Wt., gm/hr | 2768 | — | 2783 | 2770 | 2803 | 2753 |
| Material Balance, % | 99.50 | | 99.75 | 99.64 | 99.54 | 99.56 |
| Residual A, % | 1.02 | | 0.71 | 0.97 | 0.59 | 1.03 |
| Residual S, % | 2.23 | Run not | 2.18 | 3.43 | 2.85 | 5.53 |
| Residual TMSN, % | 0.61 | com- | 0.65 | 0.62 | 0.61 | 0.62 |
| Conversions, A, % | 83.01 | pleted— | 88.27 | 80.92 | 88.16 | 74.84 |
| Conversions, S, % | 84.08 | reactor | 84.56 | 77.51 | 80.93 | 66.22 |
| Conversions, Combined, % | 83.76 | plugged | 85.67 | 78.37 | 82.74 | 67.94 |
| Total New Poly A* | 5.13 | | 5.50 | 4.29 | 4.53 | 3.27 |
| Total New Poly S* | 12.13 | | 12.28 | 12.34 | 12.49 | 11.56 |
| Total New Polymer* | 17.26 | | 17.78 | 16.63 | 17.02 | 14.83 |
| Total Polymer in Feed by Calc., wt-% of product | 0 | | 3.54 | 0 | 3.57 | 0 |
| Total Polymer* | 17.26 | | 21.32 | 16.63 | 20.59 | 14.83 |
| Product Properties | | | | | | |
| Viscosity | 1508 | | 1600 | 1560 | 1560 | 1496 |
| Calc. OH No. | 35.80 | | 34.48 | 36.07 | 34.80 | 36.85 |
| Filterability | | | | | | |
| 150-Mesh Screen, % through | 100 | | 100 | 100 | 100 | 100 |
| , solids on screen, ppm | 16 | | 14 | 19 | 37 | 22 |
| 700-Mesh Screen, time, sec. | 350 | | 212 | 600 | 240 | 400 |
| , % through | 14.33 | | 100 | 23.40 | 100 | 0.33 |
| , solids on screen, ppm | 181 | | 17 | 81 | 13 | 201969 |
| CS, wt-% | 8.99 | | 1.24 | 17.23 | 1.45 | 30.91 |
| CLBT, % | 0 | | 0 | 6 | 0 | 76 |
| Light Transmission, % | 41.0 | | 54.0 | 47.0 | 50.0 | — |

| Example | 45 | 46 | 47 |
|---|---|---|---|
| Polyol-PPP Blend | 9/Ex.SS | 9/Ex.SS | 9/Ex.SS |
| Ratio of Polyol to PPP | 80/20 | 75/25 | 75/25 |
| Reaction Temperature, °C. | 125 | 125 | 125 |
| Residence Time, min. | 12 | 17 | 18 |
| Cat. Conc., wt-% in total feed (4) | 1.35 | 1.26 | 1.24 |
| Monomer content in Feed, wt-% (4) | 22.05 | 20.66 | 20.33 |
| A/S in Feed | 20/80 | 10/90 | 0/100 |
| Polyol Feed Rate, gm/hr | 2230 | 1540 | 1505 |
| Monomer Feed Rate, gm/hr (4) | 631 | 401 | 384 |
| Product Wt., gm/hr | 2846 | 1928 | 1882 |
| Material Balance, % | 99.47 | 99.33 | 99.63 |
| Residual A, % | 0.51 | 0.31 | — |
| Residual S, % | 3.76 | 6.15 | 8.60 |
| Residual TMSN, % | 0.61 | 0.55 | 0.56 |
| Conversions, A, % | 87.75 | 84.11 | — |
| Conversions, S, % | 77.42 | 65.01 | 55.11 |
| Conversions, Combined, % | 79.49 | 66.92 | 55.11 |
| Total New Poly A* | 3.80 | 1.75 | — |
| Total New Poly S* | 13.41 | 12.14 | 11.52 |
| Total New Polymer* | 17.21 | 13.89 | 11.52 |
| Total Polymer in Feed by Calc., wt-% of product | 3.56 | 3.71 | 3.81 |
| Total Polymer* | 20.77 | 17.60 | 15.33 |
| Product Properties | | | |
| Viscosity | 1640 | 2600 | 2960 |
| Calc. OH No. | 34.72 | 34.10 | 35.04 |
| Filterability | | | |
| 150-Mesh Screen, % through | 100 | 1.5 | —(5) |
| , solids on screen, ppm | 12 | 228400 | — |
| 700-Mesh Screen, time, sec. | 234 | — | — |
| , % through | 100 | 0 | — |
| , solids on screen, ppm | 4 | — | — |
| CS, wt-% | 1.73 | 34.71 | 9.41 |
| CLBT, % | 0 | 0 | 4 |
| Light Transmission, % | 45.0 | — | 58.5 |

*In product by calculation, wt-%
(4) The catalyst used was VAZO-64 and monomer contents and feed rates include the catalyst.
(5) Filtration test not run because of slight swelling and precipitation of polymer particles with isopropanol.

The data of Table XIII show that the final polymer/polyol compositions formed with preformed polymer/polyol pursuant to this invention (Examples 43 and 45) have improved dispersion stability over similar compositions prepared, however, by conventional methods or the polyol blend technique (Examples HHH–KKK). In example 42 it is believed that the reactor plugged for the reason that the amount of catalyst used in the preparation of the preformed polymer/polyol was too low or that the 50/50 A/S content of the preformed polymer/polyol was for some reason not suitable for making a final polymer/polyol composition having a 30/70 A/S content. Examples 45–47 illustrate that it is possible by the present invention to produce polymer/polyol compositions of high styrene content and improved dispersion stability (compare Example KKK with Example 45). The conversion of monomer containing 90 or 100 percent styrene in Examples 46 and 47 could be improved and dispersion stability further improved by utilizing a semi-batch process.

TABLE XIV

| Example | 48 | 49 | 50 | LLL | MMM | 51 |
|---|---|---|---|---|---|---|
| Polyol-PPP Blend or Polyol Blend | 1/Ex.TT | 1/Ex.TT | 1/Ex.TT | 1/3 | 1/3 | 1/Ex.UU |
| Ratio of Polyol to PPP or HMW Polyol | 80/20 | 80/20 | 80/20 | 60/40 | 60/40 | 70/30 |
| Reaction Temperature, °C. | 125 | 125 | 125 | 125 | 125 | 125 |
| Residence Time, min. | 12 | 12 | 12 | 12 | 12 | 12 |
| Cat. Conc., wt-% in total feed (4) | 0.8 | 0.8 | 0.8 | 1.0 | 1.16 | 1.0 |
| Monomer Content in Feed, wt % | 30.17 | 30.12 | 29.94 | 24.10 | 27.78 | 27.30 |
| A/S in Feed | 35/65 | 30/70 | 25/75 | 25/75 | 25/75 | 25/75 |
| Polyol Feed Rate, gm/hr | 1942 | 1963 | 1987 | 2100 | 1978 | 1995 |
| Monomer Feed Rate, gm/hr (4) | 839 | 846 | 849 | 667 | 761 | 749 |
| Product Wt., gm/hr | 2767 | 2798 | 2827 | 2754 | 2741 | 2732 |
| Material Balance, % | 99.50 | 99.61 | 99.68 | 99.53 | 100.07 | 99.56 |
| Residual A, % | 0.84 | 0.74 | 0.59 | 0.84 | 0.82 | 0.70 |
| Residual S, % | 1.85 | 2.68 | 3.32 | 3.81 | 3.67 | 3.77 |
| Residual TMSN, % | 0.40 | 0.41 | 0.39 | 0.48 | 0.57 | 0.65 |
| Conversions, A, % | 91.87 | 91.63 | 91.93 | 85.52 | 87.67 | 89.40 |
| Conversions, S, % | 90.36 | 87.00 | 84.87 | 78.11 | 81.62 | 80.96 |
| Conversions, Combined, % | 90.89 | 88.38 | 86.63 | 79.96 | 83.13 | 83.07 |
| Total New Poly A* | 9.72 | 8.36 | 6.98 | 5.18 | 6.12 | 6.16 |
| Total New Poly S* | 17.75 | 18.51 | 19.33 | 14.21 | 17.09 | 16.73 |
| Total New Polymer* | 27.47 | 26.87 | 26.31 | 19.39 | 23.21 | 22.89 |
| Total Polymer in Feed by Calc., wt-% of product | 2.53 | 2.55 | 2.57 | 0 | 0 | 4.64 |
| Total Polymer* | 30.00 | 29.42 | 28.88 | 19.39 | 23.21 | 27.53 |
| Product Properties | | | | | | |
| Viscosity | 3140 | 3020 | 2740 | 2624 | 2950 | 3200 |
| Calc. OH No. | 24.39 | 24.59 | 24.78 | 26.28 | 25.03 | 23.90 |
| 150-Mesh Screen, % through | 100 | 100 | 100 | 100 | 100 | 100 |
| , solids on screen, ppm | 7 | 7 | 3 | 10 | 9 | 53 |
| 700-Mesh Screen, time, sec. | 292 | 470 | 600 | 426 | 190 | 600 |
| , % through | 100 | 45.66 | 8.16 | 100 | 1.63 | 43.5 |
| , solids on screen, ppm | 6 | 13 | 86 | 26 | 3446 | 37 |
| CS, wt-% | 2.36 | 2.24 | 2.54 | 12.08 | 15.85 | 5.35 |
| CLBT, % | 0 | 0 | 0 | 4 | 2 | 2 |
| Light Transmission, % | 53.3 | 47.0 | 43.0 | 42.0 | 45.5 | 35.5 |

| Example | 52 | 53 | 54 | 55 | 56 | 57 |
|---|---|---|---|---|---|---|
| Polyol-ppp Blend | 1/Ex.UU | 1/Ex.VV | 1/Ex.TT | 1/Ex.VV | 1/Ex.SS | 1/Ex.SS |
| Ratio of Polyol to PPP | 70/30 | 60/40 | 60/40 | 60/40 | 80/20 | 80/20 |
| Reaction Temperature, °C. | 125 | 125 | 125 | 125 | 125 | 115-121 |
| Residence Time, min. | 12 | 12 | 12 | 12 | 12 | 13 |
| Cat. Conc., wt-% in total feed (4) | 1.08 | 1.0 | 1.0 | 1.03 | 1.3 | 1.3 |
| Monomer Content in Feed, wt-% (4) | 29.11 | 25.23 | 26.52 | 25.86 | 30.97 | 23.84 |
| A/S in Feed | 25/75 | 25/75 | 25/75 | 20/80 | 20/80 | 0/100 |
| Polyol Feed Rate, gm/hr | 1965 | 2057 | 2014 | 2033 | 1897 | 1884 |
| Monomer Feed Rate, gm/hr (4) | 807 | 694 | 727 | 709 | 851 | 591 |
| Product Wt., gm/hr | 2763 | 2745 | 2725 | 2735 | 2735 | 2464 |
| Material Balance, % | 99.67 | 99.78 | 99.42 | 99.74 | 99.53 | 99.55 |
| Residual A, % | 0.71 | 0.67 | 0.51 | 0.59 | 0.49 | — |
| Residual S, % | 3.77 | 3.24 | 2.68 | 4.44 | 3.93 | 8.63 |
| Residual TMSN, % | 0.68 | 0.67 | 0.57 | 0.64 | 0.70 | 0.28 |
| Conversions, A, % | 89.90 | 88.96 | 92.05 | 88.14 | 91.78 | — |
| Conversions, S, % | 82.13 | 82.20 | 86.07 | 77.70 | 83.53 | 61.82 |
| Conversions, Combined, % | 84.07 | 83.89 | 87.56 | 79.79 | 85.18 | 61.82 |
| Total New Poly A* | 6.61 | 5.61 | 6.07 | 4.61 | 5.71 | — |
| Total New Poly S* | 18.10 | 15.56 | 17.02 | 16.27 | 20.78 | 15.30 |
| Total New Polymer* | 24.71 | 21.17 | 23.09 | 20.88 | 26.49 | 15.30 |
| Total Polymer in Feed by Calc., wt-% of product | 4.52 | 6.39 | 5.36 | 6.41 | 3.16 | 3.64 |
| Total Polymer* | 29.23 | 27.56 | 28.45 | 27.29 | 29.65 | 18.94 |
| Product Properties | | | | | | |
| Viscosity | 3160 | 2920 | 3800 | 2870 | 2840 | 3830 |
| Calc. OH No. | 23.31 | 23.81 | 23.20 | 23.89 | 24.14 | 27.83 |
| Filterability | | | | | | |
| 150-Mesh Screen, % through | 100 | 100 | 100 | 100 | 100 | —(5) |
| , solids on screen, ppm | 23 | 12 | 8 | 14 | 6 | — |
| 700-Mesh Screen, time, sec. | 600 | 1200 | 410 | 1200 | 200 | — |
| , % through | 5.0 | 5.66 | 100 | 10.5 | 2.33 | — |
| , solids on screen, ppm | 260 | 353 | 14 | 205 | 730 | — |
| CS, wt-% | 7.05 | 7.95 | 1.73 | 11.17 | 7.09 | 23.10 |
| CLBT, % | 0 | 0 | 0 | 4 | 0 | 12 |
| Light Transmission, % | 38.5 | 42.8 | 51.5 | 46.0 | 43.5 | 71.0 |

| Example | 58 | 59 |
|---|---|---|
| Polyol-PPP Blend | 1/Ex.SS | 1/Ex.SS |
| Ratio of Polyol to PPP | 80/20 | 80/20 |
| Reaction Temperature, °C. | 125 | 125 |
| Residence Time, min. | 17 | 18 |
| Cat. Conc., wt-% in total feed (4) | 1.25 | 1.49 |
| Monomer content in Feed, wt-% (4) | 20.55 | 24.50 |
| A/S in Feed | 0/100 | 0/100 |

TABLE XIV-continued

| | | |
|---|---|---|
| Polyol Feed Rate, gm/hr | 1512 | 1390 |
| Monomer Feed Rate, gm/hr (4) | 391 | 451 |
| Product Wt., gm/hr | 1901 | 1836 |
| Material Balance, % | 99.89 | 99.73 |
| Residual A, % | — | — |
| Residual S, % | 8.76 | 9.66 |
| Residual TMSN, % | 0.56 | 0.68 |
| Conversions, A, % | — | — |
| Conversions, S, %. | 54.64 | 58.12 |
| Conversions, Combined, % | 54.64 | 58.12 |
| Total New Poly A* | — | — |
| Total New Poly S* | 11.57 | 14.81 |
| Total New Polymer* | 11.57 | 14.81 |
| Total Polymer in Feed by Calc., wt-% of product | 3.81 | 3.65 |
| Total Polymer* | 15.38 | 18.46 |
| Product Properties | | |
| Viscosity | 3060 | 3690 |
| Calc. OH No. | 29.51 | 28.44 |
| Filterability | | |
| 150-Mesh Screen, % through | —(5) | —(5) |
| , solids on screen, ppm | — | — |
| 700-Mesh Screen, time, sec. | — | — |
| , % through | — | — |
| , solids on screen, ppm | — | — |
| CS, wt-% | 16.14 | 23.43 |
| CLBT, % | 8 | 12 |
| Light Transmission, % | 67.0 | 71.5 |

*In product by calculation, wt-%
(4) The catalyst used was VAZO-64 and monomer contents and feed rates include the catalyst.
(5) Filtration test not run because of slight swelling and precipitation of polymer particles with isopropanol.

In Table XIV the data show that polymer/polyol compositions containing high copolymer and styrene contents can be made pursuant to this invention with higher dispersion stability as compared with similar compositions made by earlier techniques. Comparing Example MMM with Examples 53–55, it can be seen that the use of preformed polymer/polyols pursuant to this invention provides higher dispersion stability than prior techniques in the manufacture of high polymerized styrene contents. Example 57–59 illustrate the manufacture of polymer/polyol compositions in which the polymer is 100% styrene. More improved dispersion stability can be attained in Examples 57–59 by ensuring more complete polymerization of the styrene as by a semi-batch process.

TABLE XV

| Example | NNN | OOO | 60 |
|---|---|---|---|
| Polyol or Polyol-PPP Blend or Polyol Blend | 9 | 9/3 | 9/Ex.TT |
| Ratio of Polyol to PPP or HMW Polyol | 100/0 | 80/20 | 80/20 |
| Reaction Temperature, °C. | 115 | 115 | 115 |
| Residence Time, min. | 12 | 12 | 12 |
| Cat. Conc., wt-% in total feed (4) | 1.3 | 1.51 | 1.3 |
| Monomer Content in Feed, wt-% (4) | 20.86 | 24.71 | 21.13 |
| A/MMA/S in Feed | 25/25/50 | 25/25/50 | 25/25/50 |
| Polyol Feed Rate, gm/hr | 2306 | 2108 | 2232 |
| Monomer Feed Rate, gm/hr (4) | 608 | 692 | 598 |
| Product Wt., gm/hr | — | 2792 | 2812 |
| Material Balance, % | — | 99.71 | 99.36 |
| Residual A, % | | 1.55 | 0.68 |
| Residual MMA, % | | 1.68 | 0.96 |
| Residual S, % | | 2.03 | 1.32 |
| Residual TMSN, % | Run not | 0.42 | 0.66 |
| Conversions, A, % | completed-- | 73.36 | 86.38 |
| Conversions, MMA, % | reactor | 71.12 | 80.76 |
| Conversions, S, % | plugged | 82.55 | 86.78 |
| Conversions, Combined, % | | 77.40 | 85.17 |
| Total New Poly A* | | 4.49 | 4.42 |
| Total New Poly MMA* | | 4.36 | 4.13 |
| Total New Poly S* | | 10.12 | 8.88 |
| Total New Polymer* | | 18.97 | 17.43 |
| Total Polymer in Feed by Calc., wt-% off product | | 0 | 2.87 |
| Total Polymer* | | 18.97 | 20.3 |
| Product Properties | | | |
| Viscosity | | 1708 | 1552 |
| Calc. OH No. | | 35.06 | 34.83 |
| Filterability | | | |
| 150-Mesh Screen, % through | | 100 | 100 |
| , solids on screen, ppm | | 22 | 11 |
| 700-Mesh Screen, time, sec. | | 300 | 180 |
| , % through | | 4.68 | 100 |
| , solids on screen, ppm | | 1132 | 5 |
| CS, wt-% | | 15.89 | 1.41 |
| CLBT, % | | 2 | 0 |
| Light Transmission, % | | 52.0 | 66.8 |

TABLE XV-continued

| Example | NNN | OOO | 60 |
|---|---|---|---|

*In product by calculation, wt-%
(4) The catalyst used was VAZO-64 and monomer contents and feed rates include the catalyst.

The data of Table XV illustrate the manufacture of highly disperson stable polymer/polyol compositions from acrylonitrile, methyl methacrylate and styrene (Example 60) whereas the conventional process (Example NNN) failed and a polyol blend process (Example OOO) succeeded but with not as good dispersion stability.

EXAMPLES 61-73 AND QQQ-VVV

In Examples 61 through 73, low density, flexible, polyurethane foams were prepared from the polymer/polyols made in Examples 10 through 15, 35, 36 and 43 through 47 and were compared with low density, flexible, polyurethane foams (Examples QQQ through VVV) prepared from polymer/polyols which were not made according to this invention. The foam formulations given in Tables XVI, XVII and XVIII were used and the amounts given are in weight parts. The following designations are used in these Examples:

PP-1

A polymer polyol comprising a 17.54 wt-% copolymer content dispersion of an approximately 40/60 acrylonitrile-styrene copolymer containing about 7.26 wt-% polymerized acrylonitrile and about 10.28 wt-% polymerized styrene copolymerized in a polyol blend of 85 wt-% Polyol 9 and 15 wt-% Polyol 2 using VAZO catalyst. PP-1 had a hydroxyl number of 34.9 and a viscosity of 1625 cps.

PP-2

A polymer polyol comprising a 27.24 wt-% copolymer content dispersion of an approximately 40/60 acrylonitrile-styrene copolymer containing about 10.7 wt-% polymerized acrylonitrile and about 16.54 wt-% of polymerized styrene copolymerized in a polyol blend of about 80 wt-% of Polyol 10 and about 20 wt-% of Polyol 3 using VAZO catalyst. PP-2 had a hydroxyl number of 38.08 and a viscosity of 2208 cps.

PP-3

A polymer polyol comprising a 29.54 wt-% copolymer content dispersion of an approximately 73/27 acrylonitrile-styrene copolymer copolymerized in a polypropylene oxide-polyethylene oxide triol made from propylene oxide, ethylene oxide and glycerine and having a theoretical number average molecular weight of about 3400 and a hydroxyl number of about 49 in which substantially all of the ethylene oxide units are disposed internally as sequential blocks and which, based upon its total weight, contains about 10 wt-% $C_2H_4O$. PP-3 had a viscosity of about 2652 cps and a hydroxyl number of about 36.

PP-4

A polymer polyol comprising a 33.28 wt-% copolymer content dispersion of an approximately 78/22 acrylonitrile-styrene copolymer copolymerized in a polyol blend of about 80 wt-% of Polyol 10 and about 20 wt-% of Polyol 3 using VAZO catalyst. PP-4 had a hydroxyl number of about 35.67, a viscosity of about 2750 cps, a centrifugible solids of about 4.26 wt-%, a CLBT of 0, a light transmission of 59% and a filtration hindrance of:

| | |
|---|---|
| 150-Mesh Screen, % through | 100 |
| , solids on screen, ppm | 8 |
| 700-Mesh Screen, time, sec. | 168 |
| , % through | 100 |
| , solids on screen, ppm | 25 |

PP-5

A polymer polyol comprising a 28.7 wt-% copolymer content dispersion of an approximately 40/60 acrylonitrile-styrene copolymer copolymerized in a polyol blend of about 70 wt-% Polyol 10 and about 30 wt-% Polyol 3 using VAZO catalyst. PP-5 had a hydroxyl number of about 35.4 and a viscosity of about 2580 cps.

Amine Catalyst

A solution of about 27 wt-% bis(2-dimethylamino ethyl)ether in an alkoxyalkanol.

TDI

A mixture of 80 wt-% 2,4-tolylene diisocyanate and 20 wt-% 2,6-tolylene diisocyanate.

Silicone Surfactant

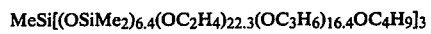
$MeSi[(OSiMe_2)_{6.4}(OC_2H_4)_{22.3}(OC_3H_6)_{16.4}OC_4H_9]_3$

TEST PROCEDURES

The following test procedures were used in Examples 61-73 and QQQ-VVV appearing below:

| Test | Procedure |
|---|---|
| Indentation Load Deflection (ILD) | ASTM D1564-69 |
| Compression Set | ASTM D1564-69 |
| Tensile Strength | ASTM D1564-69 |
| Elongation | ASTM D1564-69 |
| Tear Resistance (Strength) | ASTM D1564-69 |
| Resiliency, Ball Rebound | ASTM D1564-71 |
| Air Porosity | A specimen of foam |

½ inch in thickness is compressed between two pieces of flanged plastic tubing 2-¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen, cubic feet per minute per square foot.

<u>Rise Time</u>    The interval of time from the formation of the complete foam formulation to the attainment of the maximum height of the foam.
<u>Support Factor or Load Ratio</u> is equal to the 65% ILD value divided by the 25% ILD value.

The low density, flexible, polyurethane foams of these Examples were prepared using the following procedure. The surfactant, polymer/polyol and TDI were weighed into an 8-liter, baffled stainless steel beaker and mixed 60 seconds at 2000 rpm with two 2.5 inch 6 blade turbine stirrers (placed 2.5 inches apart at the base of the shaft). Stirring was stopped for fifteen seconds to de-gas and was continued again for five seconds. Water and the amine catalyst mixture were added and mixing continued an additional five seconds. The stannous octoate was then added and mixing continued for five seconds. The foaming mixture was poured into a 24"×24"×20" paper-lined box and foam rise time was recorded. The foam was allowed to cure overnight at room temperature. The physical properties of the foam were measured on a six inch sample taken from the bottom of upper half of foam bun and are given in Tables XVI, XVII and XVIII.

TABLE XVI

| Example | QQQ | 61 | 62 | 63 | RRR | 64 | 65 | 66 |
|---|---|---|---|---|---|---|---|---|
| Polymer/Polyol | PP-1 | Ex. 12 | Ex. 10 | Ex. 11 | PP-2 | Ex. 13 | Ex. 14 | Ex. 15 |
| Base Blend: | | | | | | | | |
| Polyol | 9(85%) | 9(85%) | 9(90%) | 9(95%) | 10(80%) | 10(80%) | 10(80%) | (80%) |
| PPP or HMW | 2(15%) | Ex.I(15%) | Ex.H(10%) | Ex.H(5%) | 3(20%) | Ex.H(20%) | Ex.K(20%) | Ex.J(20%) |
| A/S Ratio | 40/60 | 40/60 | 40/60 | 40/60 | 40/60 | 40/60 | 40/60 | 40/60 |
| Total Polymer in Product by Calc., wt-% | 17.54 | 18.79 | 19.95 | 18.78 | 27.24 | 31.65 | 28.82 | 28.16 |
| Formulation, pbw | | | | | | | | |
| Polymer/Polyol | 100.0 | 100.0 | 100.0 | 100.0 | 100.0 | 100.0 | 100.0 | 100.0 |
| Water | 4.0 | 4.0 | 4.0 | 4.0 | 4.0 | 4.0 | 4.0 | 4.0 |
| Amine Catalyst | 0.125 | 0.125 | 0.125 | 0.125 | 0.125 | 0.125 | 0.125 | 0.125 |
| Stannous Octoate | 0.20 | 0.20 | 0.20 | 0.20 | 0.20 | 0.20 | 0.20 | 0.20 |
| Silicone Surfactant | 1.0 | 1.0 | 1.0 | 1.0 | 1.0 | 1.0 | 1.0 | 1.0 |
| TDI Index | 110 | 110 | 110 | 110 | 110 | 110 | 110 | 110 |
| TDI | 48.86 | 48.50 | 48.46 | 48.63 | 49.04 | 48.64 | 48.93 | 48.98 |
| Rise Time, sec. | 83 | 83 | 88 | 89 | 84 | 81 | 85 | 82 |
| Foam Physical Properties | | | | | | | | |
| Density, lbs/ft$^3$ | 1.53 | 1.56 | 1.57 | 1.57 | 1.53 | 1.49 | 1.52 | 1.51 |
| Air Porosity, ft$^3$/min/ft$^2$ | 86 | 66 | 83 | 94 | 64 | 48 | 78 | 62 |
| Resiliency, % ball rebound | 34 | 27 | 35 | 27 | 30 | 23 | 24 | 24 |
| ILD (lbs/50 in$^2$) | | | | | | | | |
| 25% | 67.0 | 72.1 | 71.5 | 69.3 | 85.3 | 108.2 | 90.8 | 94.0 |
| 65% | 123.5 | 128.5 | 130.0 | 124.8 | 159.8 | 198.0 | 165.0 | 168.0 |
| 25% Return, % | 35.4 | 37.8 | 38.0 | 36.8 | 42.7 | 48.8 | 43.7 | 45.5 |
| Support Factor | 1.85 | 1.78 | 1.82 | 1.80 | 1.87 | 1.83 | 1.82 | 1.79 |
| Tensile Strength, psi | 18 | 18 | 19 | 19 | 19 | 21 | 20 | 19 |
| Elongation, % | 120 | 110 | 110 | 120 | 80 | 70 | 80 | 70 |
| Tear Resistance, pli | 2.6 | 2.2 | 2.4 | 2.4 | 1.90 | 1.9 | 1.9 | 1.8 |
| Compression Set, Cd % | | | | | | | | |
| 75% | 11 | 10 | 11 | 9 | 28 | 56 | 31 | 19 |

TABLE XVII

| Example | SSS | 67 | 68 | 69 | 70 | 71 |
|---|---|---|---|---|---|---|
| Polymer/Polyol | PP-1 | Ex. 43 | Ex. 44 | Ex. 45 | Ex. 46 | Ex. 47 |
| A/S Ratio | 40/60 | 30/70 | 25/75 | 20/80 | 10/90 | 0/100 |
| Total Polymer in Product by Calc., wt-% | 17.54 | 21.32 | 20.59 | 20.77 | 17.6 | 15.33 |
| Formulation, pbw | | | | | | |
| Polymer/Polyol | 100.0 | 100.0 | 100.0 | 100.0 | 100.0 | 100.0 |
| Water | 4.0 | 4.0 | 4.0 | 4.0 | 4.0 | 4.0 |
| Amine Catalyst | 0.15 | 0.15 | 0.15 | 0.15 | 0.15 | 0.15 |
| Stannous Octoate | 0.20 | 0.20 | 0.20 | 0.20 | 0.20 | 0.20 |
| Silicone Surfactant | 1.0 | 1.0 | 1.0 | 1.0 | 1.0 | 1.0 |
| TDI Index | 110 | 110 | 110 | 110 | 110 | 110 |
| TDI | 48.86 | 48.21 | 48.28 | 48.24 | 48.36 | 48.52 |
| Rise Time, secs. | 88 | 87 | 87 | 88 | 86 | 82 |
| Foam Physical Properties | | | | | | |
| Density, lbs/ft$^3$ | 1.55 | 1.57 | 1.58 | 1.56 | 1.56 | 1.56 |
| Air Porosity, ft$^3$/min/ft$^2$ | 75.5 | 57.2 | 64.3 | 71.0 | 57.2 | 75.5 |
| ILD (lbs/50 in$^2$) | | | | | | |
| 25% | 67.5 | 74.8 | 73.5 | 69.9 | 63.6 | 70.0 |
| 65% | 123.0 | 135.5 | 130.0 | 129.8 | 120.3 | 131.5 |
| 25% Return, % | 45.9 | 46.5 | 46.5 | 46.4 | 47.0 | 45.8 |
| Support Factor | 1.82 | 1.81 | 1.77 | 1.86 | 1.89 | 1.88 |
| Tensile Strength, psi | 17.6 | 16.9 | 17.4 | 16.0 | 9.9 | 13.1 |
| Elongation, % | 124 | 98 | 110 | 105 | 62 | 72 |
| Tear Resitance, pli | 2.54 | 1.99 | 1.94 | 1.79 | 0.90 | 1.23 |
| Compression Set, Cd % | | | | | | |
| 90% | 13.8 | 17.7 | 16.3 | 22.3 | 45.6 | 62.3 |

TABLE XVIII

| Example | TTT | UUU | VVV | 72 | 73 |
|---|---|---|---|---|---|
| Polymer/Polyol | PP-3 | PP-4 | PP-5 | Ex. 35 | Ex. 36 |
| Base Blend: | | | | | |
| Polyol | — | 10(80%) | 10(70%) | 10(70%) | 10(70%) |

TABLE XVIII-continued

| Example | TTT | | UUU | | VVV | | 72 | | 73 | |
|---|---|---|---|---|---|---|---|---|---|---|
| PPP or HMW | — | | 3(20%) | | 3(30%) | | Ex. RR(30%) | | Ex. RR(30%) | |
| A/S Ratio | 73/27 | | 78/22 | | 40/60 | | 40/60 | | 40/60 | |
| Total Polymer in Product by Calc., wt-% | 29.54 | | 33.28 | | 28.7 | | 33.58 | | 36.22 | |
| Formulation, pbw | (a) | (b) | (a) | (b) | (a) | (b) | (a) | (b) | (a) | (b) |
| Polymer/Polyol | 100 | 100 | 100 | 100 | 100 | 100 | 100 | 100 | 100 | 100 |
| Water | 2.4 | 4.0 | 2.4 | 4.0 | 2.4 | 4.0 | 2.4 | 4.0 | 2.4 | 4.0 |
| Amine Catalyst | 0.1 | 0.07 | 0.1 | 0.07 | 0.1 | 0.07 | 0.1 | 0.07 | 0.1 | 0.07 |
| Dipropylene Glycol | 0.6 | 0.42 | 0.6 | 0.42 | 0.6 | 0.42 | 0.6 | 0.42 | 0.6 | 0.42 |
| Stannous Octoate | 0.15 | 0.175 | 0.15 | 0.175 | 0.15 | 0.175 | 0.15 | 0.175 | 0.15 | 0.175 |
| Silicone Surfactant | 1.20 | 1.2 | 1.2 | 1.2 | 1.20 | 1.20 | 1.2 | 1.2 | 1.2 | 1.2 |
| Fyrol FR-2* | 4.0 | 4.0 | 4.0 | 4.0 | 4.0 | 4.0 | 4.0 | 4.0 | 4.0 | 4.0 |
| TDI Index | 110 | 110 | 110 | 110 | 110 | 110 | 110 | 110 | 110 | 110 |
| TDI | 32.47 | 49.28 | 32.45 | 49.20 | 32.42 | 49.44 | 32.10 | 49.12 | 31.82 | 48.84 |
| Rise Time, sec. | 121 | 95 | 126 | 96 | 121 | 99 | 123 | 97 | 114 | 97 |
| Foam Physical Properties | | | | | | | | | | |
| Density, lbs/ft$^3$ | 2.43 | 1.62 | 2.44 | 1.64 | 2.35 | 1.62 | 2.43 | 1.56 | 2.42 | 1.60 |
| Air Porosity, ft$^3$/min/ft$^2$ | 34 | 57 | 24 | 51 | 27 | 62 | 19 | 40 | 81 | 37 |
| Resiliency, % ball rebound | 31 | 26 | 28 | 26 | 31 | 27 | 31 | 24 | 27 | 23 |
| ILD (lbs/50 in$^2$) | | | | | | | | | | |
| 25% | 104.7 | 103.0 | 112.5 | 109.0 | 93.5 | 95.2 | 116.3 | 109.8 | 141.5 | 116.0 |
| 65% | 187.5 | 175.0 | 209.0 | 181.0 | 169.5 | 169.5 | 211.5 | 205.0 | >220 | 219.0 |
| 25% Return, % | 57.2 | 40.2 | 56.7 | 40.4 | 56.3 | 40.2 | 57.3 | 41.0 | 50.1 | 39.5 |
| Support Factor | 1.79 | 1.70 | 1.86 | 1.66 | 1.82 | 1.78 | 1.82 | 1.87 | — | 1.89 |
| Tensile Strength, psi | 20.7 | 21.2 | 25.1 | 22.9 | 21.4 | 19.2 | 29.6 | 20.4 | 32.9 | 22.7 |
| Elongation, % | 92 | 94 | 95 | 92 | 114 | 92 | 110 | 71 | 108 | 76 |
| Tear Resistance, pli | 2.2 | 1.9 | 2.2 | 2.0 | 2.1 | 1.8 | 2.1 | 1.8 | 2.3 | 1.9 |
| Compression Set, Cd % | | | | | | | | | | |
| 90% | 7.9 | 60 | 7.2 | 67 | 7.9 | 62 | 8.8 | 63 | 10.3 | 72 |

*A fire retardant sold by Stauffer Chemical Company and comprising a chlorinated phosphate.

The evaluations performed in Examples 61–73 and the results shown in Tables XVI–XVIII clearly show the final polymer/polyol compositions of this invention to be highly useful in the manufacture of valuable polyurethane foams.

EXAMPLES 74–78 AND WWW–YYY

In Examples 74 through 78, free rise, low density polyurethane foams were prepared from the polymer/polyols made in Examples 48, 49, 50, 56 and 57 and were compared with free rise, low density polyurethane foams prepared from polymer/polyols which were not made according to this invention. The polymer/polyols of Examples XXX and YYY were made by a procedure similar to that used to produce the polymer/polyols of Examples LLL and MMM and were characterized by the following properties:

| Example No. | XXX | YYY |
|---|---|---|
| Polyol Blend | 1/3 | 1/3 |
| Ratio of Polyol 1 to Polyol 3 | 70/30 | 70/30 |
| A/S | 50/50 | 40/60 |
| Viscosity | 3120 | 3000 |
| OH No., mg KOH/g, Found | 23.4 | 23.1 |
| Filterability | | |
| 700-Mesh Screen, % through | 100 | 100 |
| CS | 2.8 | 5.0 |

The foam formulation given below was used to produce each polyurethane foam of Examples 74–78 and WWW–YYY:

| FREE-RISE FOAM FORMULATION | |
|---|---|
| Polymer/Polyol | 100 php |
| Diethanolamine | 0.8 |
| Water | 2.75 |
| Amine Catalyst II[1] | 0.08 |
| DABCO 33LV[2] | 0.18 |
| Dibutyltindilaurate | 0.30 |
| Silicone Surfactant II[3] | 2.0 |
| Fyrol FR-2[4] | 2.0 |
| TDI | 110 Index |

[1] A blend of 30 wt-% of bis(2-dimethylaminoethyl) ether in 70 wt-% dipropylene glycol.

[2] 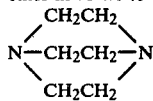

[3] A poly(dimethylsiloxane) polyether copolymer.

[4] A fire retardant comprising a chlormated phosphate sold by Stauffer Chemical Company.

The foams were produced pursuant to the procedure given in Examples 61–73 and QQQ–VVV. The physical properties of each foam were measured on a six inch sample taken from the bottom of the upper half of the foam bun and are given in Table XIX.

TABLE XIX

| Example No. | WWW | XXX | YYY | 74 | 75 | 76 | 77 | 78 |
|---|---|---|---|---|---|---|---|---|
| Polymer/Polyol of Ex. | KK | — | — | 48 | 49 | 50 | 56 | 57 |
| A/S Monomer Ratio | 78/22 | 50/50 | 40/60 | 35/65 | 30/70 | 25/75 | 20/80 | 0/100 |
| OH No., mg KOH/g, Found | ~25 | 23.5 | 23.1 | 23.6 | 23.6 | 23.7 | 22.4 | 26.5 |
| Physical Properties | | | | | | | | |
| Density, lb/ft$^3$ | 1.93 | 2.05 | 1.97 | 2.20 | 2.17 | 2.10 | 2.00 | 1.86 |
| Air Porosity, ft$^3$/min/ft$^2$ | 4.5 | 6.6 | 6.4 | 14.2 | 14.8 | 16.5 | 1.4 | 29.2 |
| Resiliency, % ball rebound | 39 | 38 | 41 | 45 | 46 | 49 | 35 | 59 |
| ILD (lbs/50 in$^2$) | | | | | | | | |
| 25% | 51.9 | 52.0 | 50.6 | 50.1 | 50.7 | 52.0 | 47.8 | 22.4 |

TABLE XIX-continued

| Example No. | WWW | XXX | YYY | 74 | 75 | 76 | 77 | 78 |
|---|---|---|---|---|---|---|---|---|
| 65% | 114.8 | 120.0 | 115.3 | 113.5 | 113.5 | 115.0 | 117.5 | 58.3 |
| 25% Return, % | 65.9 | 65.2 | 63.8 | 67.5 | 67.1 | 67.5 | 59.6 | 69.2 |
| Support Factor | 2.21 | 2.31 | 2.28 | 2.27 | 2.25 | 2.21 | 2.46 | 2.60 |
| 25%[1] | 53.8 | 50.7 | 51.4 | 45.5 | 46.7 | 49.5 | 45.8 | 24.1 |
| 65%[1] | 119.0 | 117.1 | 117.1 | 103.2 | 104.6 | 109.5 | 117.5 | 62.7 |
| Tensile Strength, psi | 23.2 | 24.5 | 29.1 | 30.1 | 29.9 | 26.1 | 14.4 | 13.5 |
| Elongation, % | 111 | 111 | 146 | 110 | 111 | 108 | 68 | 126 |
| Tear Resistance, pli | 2.35 | 2.34 | 2.51 | 1.95 | 2.29 | 2.19 | 0.95 | 1.26 |
| 65% Compression Set, Cd, % Humid Aging (5 hrs at 120° C.)[2] | 28.2 | 21.2 | 22.9 | 18.7 | 18.3 | 15.2 | 74.1 | 84.3 |
| 75% Compression Set, Cd, % | 21.0 | 24.4 | 23.5 | 35.1 | 32.1 | 36.6 | 46.3 | 29.4 |
| 50% CLD Load Loss, %[3] | 17.0 | 14.8 | 14.3 | 17.9 | 17.3 | 17.7 | 15.2 | 8.8 |

[1] Data normalized to 2.00 lb/ft$^3$ density by multiplying the measured ILD by 2 and dividing by the actual density.
[2] ASTM D-3574-77, Test J, Procedure J$_2$.
[3] Compression load deflection.

The foams of these Examples were also tested in the California Vertical Burn Test and the NBS Smoke Density test. The California Vertical Burn Tests were conducted pursuant to California Bulletin 117, issued by the California Department of Consumer Affairs, Bureau of Home Furnishings, Sacramento, California. In this test, the shorter the char length the better, a char length of six inches or less generally being considered to pass and the shorter the duration of the after flame the better, an after flame of 5 seconds or less generally being considered to pass. The NBS Smoke Density tests were performed pursuant to the description of this test promulgated by the National Bureau of Standards, Washington, D.C. In this test, the "Time for $D_s=16$" is the time in seconds for the smoke density generated by the sample of a specified size under a specified heat flux to reach that density at which an exit door cannot be seen from a prescribed distance and, generally, the shorter the time for $D_s$ the better. The "$D_s$(max.)" value is the maximum smoke density generated by the sample under the prescribed conditions of generation and measurement and, generally, the lower the value the better. The results of these tests are given in Table XX below, and show that foams produced with polymer/polyols pursuant to this invention in Examples 76, 77 and 78 containing higher amounts of polymerized styrene to be far superior (in char length and after flame duration) in the California Vertical Burn Test to foams produced with other polymer/polyols pursuant to Examples WWW, XXX and YYY. In the NBS Smoke Density Test, the values measured for the maximum smoke density [$D_s$(max.)] of foams produced with polymer/polyols pursuant to this invention (Examples 74, 75 and 76) and the foam produced with other polymer/polyols (Example WWW) were considered as being comparable for foams of this type. The values of time for $D_s=16$ appeared to be reduced for the foams made with polymer/polyols having the higher styrene contents, i.e., Examples 74, 75 and 76.

TABLE XX

| Example No. | WWW | XXX | YYY | 74 | 75 | 76 | 77 | 78 |
|---|---|---|---|---|---|---|---|---|
| A/S Monomer Ratio | 78/22 | 50/50 | 40/60 | 35/65 | 30/70 | 25/75 | 20/80 | 0/100 |
| California Vertical Burn Test | | | | | | | | |
| Char Length, in. | 12 | 12 | 12 | 12 | 12 | 6 | 3-3/8 | 3-1/2 |
|  | 12 | 12 | 12 | 12 | 12 | 2-3/4 | 4 | 3-3/8 |
|  | 12 | 12 | 12 | 12 | 12 | 6-1/2 | 3-1/2 | 3-3/8 |
|  | | | | | | 7-3/4 | 3-5/8 | 3-3/8 |
|  | | | | | | 8-1/2 | 4-7/8 | 3-1/2 |
| Average | 12 | 12 | 12 | 12 | 12 | 6-3/8 | 3-3/8 | 3-3/8 |
| Afterflame, sec. | 22.9 | 26.3 | 23.7 | 23.7 | 26.1 | 10.9 | 0 | 0 |
|  | 25.4 | 26.0 | 23.8 | 27.8 | 23.9 | 1.1 | 1.5 | 0 |
|  | 20.3 | 26.3 | 23.8 | 28.4 | 26.0 | 12.2 | 0 | 0 |
|  | | | | | | 15.2 | 0 | 0 |
|  | | | | | | 18.5 | 4.3 | 0 |
| Average | 22.9 | 26.2 | 23.8 | 26.6 | 25.3 | 11.6 | 1.2 | 0 |
| NBS Smoke Density | | | | | | | | |
| Time for $D_s=16$, sec. | 72 | | | | 47 | 38 | 39 | |
| $D_s$ (max.) | 104 | | | | 145 | 170 | 141 | |

EXAMPLES 79-87 AND ZZZ-BBBB

In Examples 79 through 87, free rise, low density, polyurethane foams were prepared from the polymer/polyols made in Examples 51, 53 and 54 and were compared with free rise, low density, polyurethane foams prepared from polymer/polyols which were not made according to this invention. The foam formulations are described in Table XXI below in which Amine Catalyst II, Silicone Surfactant II, Dabco 33LV and Fyrol FR-2 are as defined in Examples 74-78 and WWW-YYY. The foams were produced pursuant to the procedure given in Examples 61-73 and QQQ-VVV. The physical properties of each foam were measured on a six inch sample taken from the bottom of the upper half of the foam bun and are given in Table XXI.

TABLE XXI

| Example No. | ZZZ | AAAA | BBBB | 79 | 80 | 81 | 82 | 83 | 84 | 85 | 86 | 87 |
|---|---|---|---|---|---|---|---|---|---|---|---|---|
| Polymer/Polyol of Ex. KK | 100 | → | → | | | | | | | | | |
| Polymer/Polyol of Ex. 51 | | | | 100 | → | → | | | | | | |
| Polymer/Polyol of Ex. 53 | | | | | | | 100 | → | → | | | |
| Polymer/Polyol of Ex. 54 | | | | | | | | | | 100 | → | → |
| Water | 2.75 | | | | | | | | | | | |

TABLE XXI-continued

| Example No. | ZZZ | AAAA | BBBB | 79 | 80 | 81 | 82 | 83 | 84 | 85 | 86 | 87 |
|---|---|---|---|---|---|---|---|---|---|---|---|---|
| Diethanolamine | 0.80 | → | → | → | → | → | → | → | → | → | → | → |
| Amine Catalyst II | 0.08 | | | | | | | | | | | |
| DABCO 33LV | 0.18 | | | | | | | | | | | |
| Dibutyltindilaurate | 0.30 | → | → | → | → | → | → | → | → | 0.20 | 0.35 | → | → |
| Silicone Surfactant II | 2.0 | | | | | | | | | | | |
| Fyrol FR-2 | 2.0 | 4.0 | 6.0 | 2.0 | 4.0 | 6.0 | 2.0 | 4.0 | 6.0 | 2.0 | 4.0 | 6.0 |
| TDI, 110 Index | 35.6 | → | → | 35.3 | → | → | 35.3 | → | → | 36.0 | → | → |
| Rise Time, secs. | 70 | 71 | 72 | 65 | 70 | 80 | 89 | 97 | 90 | 59 | 62 | 60 |
| Foam Settle, In. | 0 | 0 | 0 | 0 | 0 | 0 | 0 | 0 | 0 | 1 | 1 | 1 |
| Density, lb/in$^3$ | 2.06 | 2.11 | 2.13 | 1.99 | 2.03 | 2.27 | 2.00 | 2.16 | 1.98 | 2.58 | 2.50 | 2.54 |
| Porosity, ft$^3$/min/ft$^2$ | 14.3 | 18.8 | 17.3 | 34.5 | 29.2 | 15.7 | 29.2 | 6.6 | 31.9 | 6.8 | 7.4 | 5.4 |
| Resiliency, % ball rebound | 46 | 47 | 47 | 42 | 44 | — | 43 | 52 | 47 | 47 | 45 | — |
| ILD (lb/50 in$^2$) | | | | | | | | | | | | |
| 25% | 57.8 | 56.2 | 55.8 | 63.8 | 61.2 | not tested | 60.6 | 44.5 | 43.2 | 52.9 | 52.9 | not tested |
| 65% | 120.3 | 117.3 | 115.0 | 113.0 | 112.8 | | 114.8 | 105.0 | 93.0 | 135.3 | 129.3 | |
| 25% Return, % | 67.8 | 67.8 | 67.6 | 63.0 | 63.7 | | 61.1 | 65.4 | 62.0 | 68.1 | 68.2 | |
| Support Factor | 2.08 | 2.09 | 2.06 | 1.77 | 1.84 | | 1.89 | 2.36 | 2.15 | 2.56 | 2.44 | |
| 25% (1) | 58.9 | 55.9 | 55.0 | 67.3 | 63.3 | — | 63.6 | 43.3 | 45.8 | 43.1 | 44.4 | — |
| 65% (1) | 122.6 | 116.7 | 113.4 | 119.2 | 116.7 | — | 120.5 | 102.1 | 98.6 | 110.1 | 108.6 | — |
| Tensile Strength, lb/in$^2$ | 25.8 | 28.6 | 28.0 | 16.6 | 18.3 | 18.6 | 16.7 | 20.7 | 12.6 | 26.8 | 28.9 | 25.4 |
| Elongation, % | 103 | 114 | 117 | 86 | 89 | 71 | 82 | 59 | 68 | 82 | 99 | 86 |
| Tear Resistance, lb/in | 2.34 | 2.15 | 2.34 | 1.74 | 1.74 | 1.43 | 1.24 | 1.20 | 1.12 | 1.74 | 1.75 | 1.71 |
| 75% Compression Set, Cd, % | 14.4 | 11.5 | 11.9 | 11.4 | 13.4 | 20.3 | 15.1 | 22.3 | 26.1 | 23.5 | 22.9 | 27.4 |
| Humid Aging (5 hrs at 120° C.) | | | | | | | | | | | | |
| 50% Compression Set, Cd, % | 26.2 | 26.2 | 25.3 | 23.3 | 29.3 | 45.1 | 34.7 | 49.2 | 59.2 | 49.8 | 47.2 | 48.0 |
| 50% CLD Load Loss, % | 21.3 | 19.2 | 19.0 | 16.0 | 16.4 | 20.1 | 17.9 | 12.8 | 13.1 | 14.1 | 14.8 | 14.4 |

(1) The data are normalized to 2.10 pcf density.

The foams of these Examples were also tested in the California Vertical Burn Test and the NBS Smoke Density Test as described in Examples 74–78 and WWW-YYY. The results of these tests are given in Table XXII below. As the results show, the foams produced using the polymer/polyols of this invention (Examples 79, 80, 82–86) containing higher amounts of polymerized styrene were far superior in flammability characteristics (low char lengths and afterflame durations) to foams made with other polymer/polyols (Examples ZZZ through BBBB).

TABLE XXII

| Example No. | | ZZZ | AAAA | BBBB | 79 | 80 | 82 | 83 | 84 | 85 | 86 |
|---|---|---|---|---|---|---|---|---|---|---|---|
| Polymer/Polyol of Ex. KK | | 100 | → | → | | | | | | | |
| Polymer/Polyol of Ex. 51 | | | | | 100 | → | | | | | |
| Polymer/Polyol of Ex. 53 | | | | | | | 100 | → | → | | |
| Polymer/Polyol of Ex. 54 | | | | | | | | | | 100 | → |
| Fyrol FR-2 | | 2 | 4 | 6 | 2 | 4 | 2 | 4 | 6 | 2 | 4 |
| A/S Monomer Ratio | | 78/22 | → | → | 25/75 | → | → | → | → | → | → |
| California Vertical Burn Test | | | | | | | | | | | |
| Char Length, in. | | 12.0 | 12.0 | 12.0 | 6.3 | 3.2 | 2.8 | 3.0 | 2.9 | 4.5 | 3.8 |
| | | 12.0 | 12.0 | 12.0 | 3.5 | 2.8 | 3.0 | 3.1 | 3.1 | 3.7 | 2.3 |
| | | 12.0 | 12.0 | 12.0 | 3.4 | 2.9 | 3.1 | 3.4 | 3.3 | 6.7 | 2.3 |
| | | | | | 6.7 | 3.2 | 3.2 | 3.2 | 3.0 | 5.8 | 4.0 |
| | | | | | 3.2 | 3.2 | 6.7 | 2.7 | 3.3 | 6.5 | 2.7 |
| | Average | 12.0 | 12.0 | 12.0 | 4.6 | 3.1 | 3.8 | 3.1 | 3.1 | 5.4 | 3.0 |
| Afterflame, secs. | | 21.5 | 23.5 | 24.9 | 9.6 | 0 | 0 | 0 | 0 | 11.3 | 8.7 |
| | | 20.9 | 24.3 | 24.1 | 0 | 0 | 0 | 0 | 0 | 4.6 | 0 |
| | | 21.0 | 24.1 | 26.7 | 0 | 0 | 0 | 0 | 0 | 11.8 | 0 |
| | | | | | 11.7 | 0 | 0 | 0 | 0 | 14.3 | 4.6 |
| | | | | | 0 | 0 | 15.5 | 0 | 0 | 11.7 | 1.3 |
| | Average | 21.1 | 24.0 | 25.2 | 4.3 | 0 | 3.1 | 0 | 0 | 10.7 | 2.9 |

What is claimed is:

1. In a polymer/polyol composition which is convertible by reaction with a polyisocyanate to a polyurethane product wherein the polyol of said composition is normally liquid at the temperature at which said composition is converted to said polyurethane product and the polymer of said polymer/polyol is formed in situ in the polyol thereof from one or more polymerizable ethylenically unsaturated monomer, the improvement providing more stable dispersions of small particles of said polymer in the polyol, comprising, an improved dispersion of said polymer prepared by the in situ polymerization of one or more polymerizable ethylenically unsaturated monomers in a blend of a first polyol having a number average molecular weight of at least about 76 and a minor amount of a preformed polymer/polyol prepared by the in situ polymerization of one or more polymerizable ethylenically unsaturated monomers in a second polyol, wherein said preformed polymer/polyol and said improved dispersion have greater dispersion stabilities than the polymer/polyol having the same chemical composition as that of said novel dispersion and made in the same manner as said novel dispersion but in the absence of said preformed polymer/polyol and said preformed polymer/polyol has a viscosity of less than 40,000 cps at 25° C., said polymer being dispersed in said polyol.

2. Composition as claimed in claim 1 wherein said improved dispersion has a centrifugible solids of at least 10 percent less than that of said polymer/polyol having the same chemical composition as that of said novel dispersion and made in the same manner as said novel dispersion but in the absence of said preformed polymer/polyol.

3. Composition as claimed in claim 1 wherein said improved dispersion has a centrifugible solids of at least 30 percent less than that of said polymer/polyol having the same chemical composition as that of said novel dispersion and made in the same manner as said novel dispersion but in the absence of said preformed polymer/polyol.

4. Composition as claimed in claim 1 wherein said improved dispersion has a centrifugible solids of at least 50 percent less than that of said polymer/polyol having the same chemical composition as that of said novel dispersion and made in the same manner as said novel dispersion but in the absence of said preformed polymer/polyol.

5. Composition as claimed in claim 1 wherein said preformed polymer/polyol has a viscosity of not more than 35,000 cps at 25° C.

6. Composition as claimed in claim 1 wherein said preformed polymer/polyol has a viscosity of not more than 10,000 cps at 25° C.

7. Composition as claimed in claim 1 wherein said first and second polyols are different and said preformed polymer/polyol has a centrifugible solids of not more than about 20 wt-%.

8. Composition as claimed in claim 7 wherein said preformed polymer/polyol has a centrifugible solids of not more than about 10 wt-%.

9. Composition as claimed in claim 1 wherein said first polyol has a number average molecular weight of at least about 134 and said second polyol has a number average molecular weight of at least about 3000.

10. Composition as claimed in claim 1 wherein said first polyol has a number average molecular weight of less than 3000 and said second polyol has a number average molecular weight greater than that of said first polyol.

11. Composition as claimed in claim 1 wherein said blend comprises about 55 to about 95 wt-% of said first polyol and about 5 to about 45 wt-% of said preformed polymer/polyol.

12. Composition as claimed in claim 1 wherein said blend comprises about 70 to about 90 wt-% of said first polyol and about 10 to about 30 wt-% of said preformed polymer/polyol.

13. Composition as claimed in claim 1 wherein the total amount of polymer dispersed in said blend is about 4 to about 45 wt-% based on the weight of the composition.

14. Composition as claimed in claim 1 wherein the amount of polymer dispersed in said blend is about 15 to about 40 wt-% based on the weight of the composition.

15. Composition as claimed in claim 14 wherein said polymer comprises polymerized acrylonitrile.

16. Composition as claimed in claim 14 wherein said polymer comprises at least 75 wt-% polymerized styrene.

17. Composition as claimed in claim 15 wherein said polymer consists essentially of acrylonitrile.

18. Composition as claimed in claim 15 wherein said polymer also contains polymerized styrene.

19. Composition as claimed in claim 18 wherein the weight ratio of polymerized acrylonitrile to polymerized styrene in said polymer ranges from 20:80 to 100:0.

20. Composition as claimed in claim 18 wherein the weight ratio of polymerized acrylonitrile to polymerized styrene in said polymer ranges from 25:75 to 0:100.

21. Composition as claimed in claim 20 wherein said ratio is 25:75.

22. Composition as claimed in claim 19 wherein the weight ratio of polymerized acrylonitrile to polymerized styrene in said polymer ranges from about 40:60 to 85:15.

23. Composition as claimed in claim 18 wherein said polymer also contains polymerized methyl methacrylate.

24. Composition as claimed in claim 23 wherein the weight ratio of polymerized acrylonitrile to polymerized methyl methacrylate to polymerized styrene is about 25 to about 25 to about 50.

25. Composition as claimed in claim 1 wherein the number average molecular weight of the first polyol is in the range of about 76 to about 5000 and that of the second polyol is in the range of about 3000 to about 20000.

26. Composition as claimed in claim 1 wherein the number average molecular weight of the first polyol is in the range of about 134 to about 3000 and that of the second polyol is in the range of about 3000 to about 15000.

27. Composition as claimed in claim 1 wherein said preformed polymer/polyol is prepared by polymerization in the presence of a peroxyester free radical catalyst.

28. Composition as claimed in claim 27 wherein said polymerization of said polymerizable ethylenically unsaturated monomers in a blend of said first polyol and said preformed polymer/polyol is carried out in the presence of 2,2'-azo-bisisobutyronitrile.

29. In a process for producing a liquid polymer/polyol composition which is convertible by reaction with a polyisocyanate to a polyurethane product wherein the polyol of said composition is normally liquid at the temperature at which said composition is converted to said polyurethane product and said polymer is formed in situ in said polyol from one or more polymerizable ethylenically unsaturated monomers, the improvement utilizing first and second polyols and providing more stable dispersions of small particles of said polymer in said polyols, comprising, polymerizing one or more polymerizable ethylenically unsaturated monomers in the presence of a first free radical catalyst in said second polyol to form a preformed polymer/polyol having a viscosity of less than 40000 cps at 25° C.; mixing a major amount of said first polyol having a number average molecular weight of at least about 76 with a minor amount of said preformed polymer/polyol to form a mixture thereof; and polymerizing one or more polymerizable ethylenically unsaturated monomers in the presence of a second free radical catalyst in said mixture to form said composition in which said polymer is formed in situ from both said portions of said monomer or monomers and is dispersed in said polyols and wherein each of said preformed polymer/polyol and said more stable dispersion have a greater dispersion stability than the polymer/polyol having the same chemical composition as that of said more stable dispersion and made in the same manner as said more stable dispersion but in the absence of said preformed polymer/polyol.

30. Process as claimed in claim 29 wherein said mixture comprises about 55 to about 95 wt-% of said first polyol and about 5 to about 45 wt-% of said preformed polymer/polyol.

31. Process as claimed in claim 29 wherein said first and second free radical catalysts are the same.

32. Process as claimed in claim 29 wherein said second free radical catalyst is 2,2'-azo-bis-isobutyronitrile.

33. Process as claimed in claim 29 wherein said first free radical catalyst is a preoxyester free radical catalyst.

34. Process as claimed in claim 29 wherein said first free radical catalyst is a peroxyester free radical catalyst and said second free radical catalyst is 2,2'-azo-bis-isobutyronitrile.

35. A method for producing a polyurethane elastomer by reacting a mixture comprising (a) a polymer/polyol composition as claimed in claim 1 and (b) an organic polyisocyanate, in the presence of (c) a catalyst for the reaction of (a) and (b) to produce the polyurethane.

36. A method for producing a polyurethane foam by reacting and foaming a mixture comprising (a) the polymer/polyol composition claimed in claim 1, (b) an organic polyisocyanate, (c) a catalyst for the reaction of (a) and (b) to produce the polyurethane, (d) a blowing agent and (e) a foam stabilizer.

37. A method as claimed in claim 36 wherein the foam is a flexible foam, the reaction and foaming are preformed by the one-shot technique, the polymer/polyol composition contains an alkylene oxide adduct of a polyhydroxyalkane, the blowing agent is water and the water is used in an amount to provide a foam having a density of less than 1.75 pounds per cubic foot.

38. Method as claimed in claim 36 in which said polymer/polyol composition is that claimed in claim 18.

39. Method as claimed in claim 36 in which said polymer/polyol composition is that claimed in claim 20.

* * * * *

UNITED STATES PATENT AND TRADEMARK OFFICE
CERTIFICATE OF CORRECTION

PATENT NO. : 4,148,840

DATED : April 10, 1979

INVENTOR(S) : N. R. Shah

It is certified that error appears in the above-identified patent and that said Letters Patent are hereby corrected as shown below:

In the Abstract, eighth line, for "mer/polyl" read -- mer/polyol --.

In column 20, Table II, Table columns "D" and "E", fourth entries, for "VAZO-Γ" and "VAZO", read respectively -- VAZO-64 -- and --VAZO-64--.

In column 19, Table II, Table column "G", fourth entry, for "VAXO-64" read -- VAZO-64 --.

In columns 21-22, Table III, Table row "Monomer Content in feed wt-%(1)", for the entries "22.89 (1) 23.38 18.25 12.38    " read respectively the entries -- 22.09 22.06 28.89 23.38 18.25 12.38 --.

In column 23, Table IV, Table row "Conversions, S % 83.7" for "Conversions, S%83.7" read -- Conversions, S % --.

In columns 23-24, Table VI, Table row "Conversions, S % 83.7", for the entries "88.30 91.21 91.76    " read respectively the entries -- 83.7 88.30 91.21 91.76 --.

In column 23, Table IV, Table row "Calc.No.", for "Cal.No." read -- Calc.OH No. --.

In column 23, Table IV, Table row "CLBTp%rtion",) for "CLBTp%rtion",) read -- CLBT,%--.

UNITED STATES PATENT AND TRADEMARK OFFICE
CERTIFICATE OF CORRECTION

PATENT NO. : 4,148,840
DATED : April 10, 1979
INVENTOR(S) : N. R. Shah

It is certified that error appears in the above-identified patent and that said Letters Patent are hereby corrected as shown below:

In columns 25-26, Table V, Table row "CS,wt-%", for the entries "15.5719.044.90 4.30    " read respectively the entries -- 15.57 19.04 4.90 4.30".

In column 27, Table V, Table row "Product Wt., gm/hr 2769" read -- Product Wt., gm/hr --.

In column 28, Table V, Table row "Product Wt., gm/hr 2769", for the entries "2756 2732    " read respectively the entries -- 2769 2756 2732 --.

In columns 27-28, Table V, between Table rows "Conversions, A,%" and "Conversions, Combined,%" read the row -- Conversions, S, % 86.43 84.16 90.86 --.

In columns 33-34, Table VIII, Table row "Reaction Temperature, °C.", for the entries "120 125 125 125 125    " read respectively the entries -- 120 120 125 125 125 125 --.

In columns 33-34, Table VIII, Table row "120", delete the entire row.

In column 53, Table XXI, Table row "Water", read the bracket (which is shown in column 55, Table XXI, as extending above Table row "Diethanolamine") as encompassing "2.75".

In column 55, Table row "Fyrol FR-2", do not read the bracket as encompassing "2.0".

In column 56, Table XXI, Table columns "84 85", read "0.20 0.35" as -- 0.20  0.35⎫
                                                                       1.5   3.0 ⎭ --.

UNITED STATES PATENT AND TRADEMARK OFFICE
CERTIFICATE OF CORRECTION

PATENT NO. : 4,148,840
DATED : April 10, 1979
INVENTOR(S) : N. R. Shah

It is certified that error appears in the above–identified patent and that said Letters Patent are hereby corrected as shown below:

In claim 1, eighth line, for "monomer" read --monomers--.

In claim 20, third line, for "0:100" read --100:0--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,148,840
DATED : April 10, 1979
INVENTOR(S) : N. R. Shah

It is certified that error appears in the above-identified patent and that said Letters Patent are hereby corrected as shown below:

In column 5, line 58, for "phosphorus" read -- phosphorous --.

In column 13, line 30, for "triethylanolamine" read -- triethanolamine --.

In column 19, Table II, Table column "Example" fourth entry, for "Typle" read -- Type --.

In columns 21-22, Table III, Table row "Monomer Content in feed wt-%(1)", for the third entry as corrected (Table column "N"), for "28.89" read --22.89 --.

In column 26, Table V, Table row "Total New Poly A*", in Table column BB, please read the entry -- 7.05 --.

UNITED STATES PATENT AND TRADEMARK OFFICE
CERTIFICATE OF CORRECTION

PATENT NO. : 4,148,840
DATED : April 10, 1979
INVENTOR(S) : N. R. Shah

It is certified that error appears in the above–identified patent and that said Letters Patent are hereby corrected as shown below:

In column 26, Table V, between Table Rows "Total New Poly A*" and "Total Poly S*, in Table column AA, please delete "7.05".

In column 34, Table VIII, Table row "Monomer Feed Rate, gm/hr (4)", Table columns "20", "XX", and "21", for the entries "574 488    " please read -- 649 574 488 ---.

In column 34, Table VIII, Table row "Total New Poly A*, Table columns "20", "XX" and "21", for the entries "8.76 7.34    " please read -- 8.41 8.76 7.34 --.

In column 46, Table XV, Table row "Total Polymer in Feed by Calc. wt-% of product", for "off" please read -- of --.

Signed and Sealed this

Twenty-fifth Day of March 1980

[SEAL]

Attest:

SIDNEY A. DIAMOND

Attesting Officer

Commissioner of Patents and Trademarks